US011913801B2

(12) United States Patent
Goei

(10) Patent No.: US 11,913,801 B2
(45) Date of Patent: *Feb. 27, 2024

(54) UNIVERSAL AUTOMATED SYSTEM FOR IDENTIFYING, REGISTERING AND VERIFYING THE EXISTENCE, LOCATION AND CHARACTERISTICS OF ELECTRIC AND OTHER POWER OUTLETS BY RANDOM USERS AND FOR RETRIEVAL AND UTILIZATION OF SUCH PARAMETRIC DATA AND OUTLETS BY ALL USERS

(71) Applicant: Power Hero Corp., La Verne, CA (US)

(72) Inventor: Esmond Goei, La Verne, CA (US)

(73) Assignee: Power Hero Corp., La Verne, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/367,343

(22) Filed: Sep. 12, 2023

(65) Prior Publication Data
US 2023/0417568 A1    Dec. 28, 2023

Related U.S. Application Data

(63) Continuation of application No. 17/104,123, filed on Nov. 25, 2020, now Pat. No. 11,796,340, which is a
(Continued)

(51) Int. Cl.
*G01C 21/36* (2006.01)
*B60L 53/66* (2019.01)
(Continued)

(52) U.S. Cl.
CPC ........ *G01C 21/3679* (2013.01); *B60L 53/305* (2019.02); *B60L 53/65* (2019.02);
(Continued)

(58) Field of Classification Search
CPC ... G01C 21/3679; B60L 53/305; B60L 53/65; B60L 53/66; B60L 53/67; B60L 2240/72; G06Q 10/02; G07F 15/005; H02J 13/0005
(Continued)

(56) References Cited

U.S. PATENT DOCUMENTS 5,711,648 A    1/1998   Hammerslag
5,857,155 A * 1/1999   Hill ..................... H04W 84/022
                                                     342/357.29

(Continued)

OTHER PUBLICATIONS

Australian Patent Office: First Examination Report of AU 2017308799 (related application); dated Nov. 2, 2021; 4 pages.
(Continued)

*Primary Examiner* — John T Trischler

(57) ABSTRACT

A system for registering power outlets for electric vehicle charging that may be used to charge electric vehicles. A database stores subscriber data relating to subscribers registered with the system and power outlet data relating to registered power outlets for electric vehicle charging that have been located by a reporting entity. A server provides a power outlet management system that receives the power outlet data for a power outlet for electric vehicle charging from the reporting entity, registers the power outlet for electric vehicle charging with the power outlet management system if the power outlet electric vehicle charging has not previously been registered and stores the power outlet data for the power outlet for electric vehicle charging in the database. The server is further configured to receive a search request for a useable power outlet for electric vehicle charging from a subscriber, the search request including location information defining an area of search for the useable power outlet for electric vehicle charging, locate at least one power outlet for electric vehicle charging within
(Continued)

the area of search that is registered with the power outlet management system and provide a location of the at least one power outlet for electric vehicle charging located within the area of search to the subscriber. A network interface for connecting the server to a network for receiving the power outlet data and the search request.

19 Claims, 15 Drawing Sheets

Related U.S. Application Data continuation-in-part of application No. 15/477,669, filed on Apr. 3, 2017, now Pat. No. 10,857,902.

(60) Provisional application No. 62/940,004, filed on Nov. 25, 2019.

(51) Int. Cl.
| | |
|---|---|
| *G07F 15/00* | (2006.01) |
| *G06Q 10/02* | (2012.01) |
| *H02J 13/00* | (2006.01) |
| *B60L 53/30* | (2019.01) |
| *B60L 53/67* | (2019.01) |
| *B60L 53/65* | (2019.01) |

(52) U.S. Cl.
CPC .............. *B60L 53/66* (2019.02); *B60L 53/67* (2019.02); *G06Q 10/02* (2013.01); *G07F 15/005* (2013.01); *H02J 13/0005* (2020.01); *B60L 2240/72* (2013.01)

(58) Field of Classification Search
USPC .......................................... 701/426; 320/109
See application file for complete search history.

(56) References Cited

U.S. PATENT DOCUMENTS

| | | | |
|---|---|---|---|
| 6,854,642 B2 * | 2/2005 | Metcalf ................. G07F 7/1008 235/382 |
| 6,941,197 B1 * | 9/2005 | Murakami ............ B60L 53/305 320/135 |
| 7,076,468 B2 | 7/2006 | Hillegass et al. |
| 7,521,138 B2 * | 4/2009 | Pearson .............. H01M 8/0491 320/101 |
| 7,657,763 B2 | 2/2010 | Nelson et al. |
| 7,742,776 B2 * | 6/2010 | Annunziato .......... G01S 5/0244 455/67.11 |
| 7,804,274 B2 * | 9/2010 | Baxter ................ G06Q 20/3278 414/281 |
| 7,827,057 B1 * | 11/2010 | Walker ................ G06Q 30/0234 705/14.1 |
| 7,906,937 B2 * | 3/2011 | Bhade .................. B60L 53/305 320/136 |
| 7,952,325 B2 * | 5/2011 | Baxter .................... B60L 53/31 414/281 |
| 7,986,126 B1 | 7/2011 | Bucci et al. |
| 8,013,570 B2 * | 9/2011 | Baxter ................... B60L 53/64 320/108 |
| 8,072,184 B2 * | 12/2011 | Bhade .................... B60L 53/68 320/136 |
| 8,143,842 B2 | 3/2012 | Tyler et al. |
| 8,198,859 B2 | 6/2012 | Tyler et al. |
| 8,258,743 B2 | 9/2012 | Tyler et al. |
| 8,305,032 B2 | 11/2012 | McKenna |
| 8,350,526 B2 * | 1/2013 | Dyer ...................... B60L 55/00 320/109 |
| 8,359,126 B2 | 1/2013 | Tate, Jr. et al. |
| 8,384,347 B2 * | 2/2013 | Thomas .............. H02J 7/00047 320/109 |
| 8,487,584 B2 | 7/2013 | Taylor-Haw et al. |
| 8,502,500 B2 * | 8/2013 | Baxter ..................... B60L 3/12 320/108 |
| 8,513,917 B2 | 8/2013 | Gomi et al. |
| 8,564,403 B2 | 10/2013 | Landau-Holdsworth et al. |
| 8,577,528 B2 | 11/2013 | Uyeki |
| 8,595,122 B2 * | 11/2013 | Kamer .................... B60L 58/40 705/37 |
| 8,698,642 B2 * | 4/2014 | Taguchi ................... B60L 3/12 340/636.11 |
| 8,700,456 B2 | 4/2014 | Walker et al. |
| 8,710,372 B2 * | 4/2014 | Karner .................... B60L 53/18 174/136 |
| 8,816,879 B2 * | 8/2014 | Stefik ...................... G06Q 10/02 340/425.5 |
| 8,849,687 B2 * | 9/2014 | Hakim ............. G06Q 10/06315 705/7.13 |
| 8,872,379 B2 * | 10/2014 | Ruiz ...................... B60L 1/003 307/66 |
| 8,914,638 B2 | 12/2014 | Kawamoto et al. |
| 8,965,669 B2 | 2/2015 | Fisher et al. |
| 8,983,875 B2 * | 3/2015 | Shelton .................... B60L 3/04 320/109 |
| 9,013,283 B1 | 4/2015 | Tackaberry |
| 9,026,347 B2 | 5/2015 | Gadh et al. |
| 9,085,241 B2 * | 7/2015 | Asano .................... B60L 55/00 |
| 9,121,718 B2 * | 9/2015 | Uyeki ............... G01C 21/3469 |
| 9,153,847 B2 * | 10/2015 | Harty .................... B60L 53/53 |
| 9,179,558 B1 | 11/2015 | Limber et al. |
| 9,283,857 B2 * | 3/2016 | Shelton .................. B60L 53/54 |
| 9,358,894 B2 * | 6/2016 | Shelton .................. G06Q 30/04 |
| 9,367,108 B2 | 6/2016 | Asghari et al. |
| 9,418,345 B1 * | 8/2016 | Meehan ................. G06Q 10/02 |
| 9,442,548 B1 * | 9/2016 | Johansson ............. G06F 1/3234 |
| 9,452,684 B2 * | 9/2016 | Shelton .................... H02J 4/00 |
| 9,476,725 B2 | 10/2016 | Fisher et al. |
| 9,496,736 B1 * | 11/2016 | Johansson .............. G06Q 10/00 |
| 9,505,314 B2 * | 11/2016 | Widmer .................. H02J 50/70 |
| 9,610,853 B1 | 4/2017 | Miller et al. |
| 9,647,474 B2 | 5/2017 | Fathollahi et al. |
| 9,697,553 B2 * | 7/2017 | Walker ............... G06Q 30/0611 |
| 9,715,780 B2 * | 7/2017 | Garrison ................. G07F 9/001 |
| 9,779,365 B2 * | 10/2017 | Smullin ................. G06Q 10/02 |
| 9,796,280 B2 * | 10/2017 | McCool ................... H02J 50/12 |
| 9,872,226 B2 * | 1/2018 | Hasegawa ............. H04W 60/00 |
| 9,929,577 B2 | 3/2018 | Fathollahi et al. |
| 10,084,329 B2 * | 9/2018 | Hamilton ................ G07F 9/001 |
| 10,141,694 B2 | 11/2018 | Geo |
| 10,161,759 B2 | 12/2018 | Fisher et al. |
| 10,275,797 B2 | 4/2019 | Freytag |
| 10,279,697 B2 | 5/2019 | Uyeki |
| 10,283,984 B2 * | 5/2019 | Maguire ................. H02J 7/0044 |
| 10,286,792 B2 * | 5/2019 | Shelton .................. B60L 53/65 |
| 10,312,700 B2 * | 6/2019 | Roberts .................. H05K 7/14 |
| 10,348,092 B1 | 7/2019 | Diaz |
| 10,354,301 B2 * | 7/2019 | Chang .................. G06Q 20/145 |
| 10,355,503 B2 | 7/2019 | Fathollahi et al. |
| 10,377,256 B2 | 8/2019 | Nishida |
| 10,410,250 B2 | 9/2019 | Singhal et al. |
| 10,430,833 B2 | 10/2019 | Newman |
| 10,515,390 B2 | 12/2019 | Pouliot |
| 10,586,254 B2 | 3/2020 | Singhal |
| 10,673,258 B2 | 6/2020 | Kemppainen et al. |
| 10,682,922 B2 * | 6/2020 | Shelton .................... H02J 4/00 |
| 10,699,305 B2 | 6/2020 | Ricci |
| 10,723,230 B2 | 7/2020 | Mastrandrea |
| 10,857,902 B2 | 12/2020 | Goei et al. |
| 10,859,390 B2 | 12/2020 | Fisher et al. |
| 10,899,235 B2 | 1/2021 | Forbes, Jr. et al. |
| 10,949,885 B2 | 3/2021 | Xiao et al. |
| 10,960,782 B2 | 3/2021 | Goei |
| 10,970,746 B2 | 4/2021 | Singhal et al. |
| 11,017,615 B2 | 5/2021 | Kimura |
| 11,052,778 B2 | 7/2021 | McCool et al. |
| 11,180,041 B2 | 11/2021 | Nishida |
| 11,413,982 B2 | 8/2022 | Goei |
| 11,420,528 B2 | 8/2022 | Kemppainen et al. |
| 2002/0010681 A1 | 1/2002 | Hillegass et al. |
| 2002/0095487 A1 | 7/2002 | Day et al. |

(56) References Cited

U.S. PATENT DOCUMENTS

| | | | |
|---|---|---|---|
| 2002/0173924 A1* | 11/2002 | Lin | G06Q 30/02 702/81 |
| 2003/0150907 A1 | 8/2003 | Metcalf et al. | |
| 2003/0178487 A1* | 9/2003 | Rogers | G07F 9/002 235/454 |
| 2004/0078276 A1 | 4/2004 | Shimogori | |
| 2005/0139649 A1* | 6/2005 | Metcalf | G07F 19/20 235/375 |
| 2005/0246436 A1 | 11/2005 | Day et al. | |
| 2006/0181243 A1* | 8/2006 | Graves | G16H 40/20 320/116 |
| 2006/0190409 A1 | 8/2006 | Hillegass et al. | |
| 2007/0112622 A1 | 5/2007 | Meggs | |
| 2007/0150355 A1* | 6/2007 | Meggs | G06Q 30/0215 705/14.17 |
| 2007/0155349 A1 | 7/2007 | Nelson et al. | |
| 2007/0282495 A1* | 12/2007 | Kempton | B60L 8/00 701/22 |
| 2008/0007210 A1 | 1/2008 | Butler | |
| 2008/0262920 A1* | 10/2008 | O'Neill | G06Q 30/02 705/26.1 |
| 2008/0281663 A1* | 11/2008 | Hakim | H02J 3/466 705/7.25 |
| 2009/0164152 A1 | 6/2009 | Creus et al. | |
| 2010/0013433 A1* | 1/2010 | Baxter | G07F 15/003 320/109 |
| 2010/0013434 A1 | 1/2010 | Taylor-Haw et al. | |
| 2010/0017045 A1* | 1/2010 | Nesler | B60L 53/665 700/295 |
| 2010/0114800 A1* | 5/2010 | Yasuda | H04L 41/00 429/163 |
| 2010/0134067 A1* | 6/2010 | Baxter | B60L 3/0084 320/109 |
| 2010/0141203 A1 | 6/2010 | Graziano et al. | |
| 2010/0141204 A1 | 6/2010 | Tyler et al. | |
| 2010/0141205 A1 | 6/2010 | Tyler et al. | |
| 2010/0145535 A1 | 6/2010 | Tyler et al. | |
| 2010/0145540 A1 | 6/2010 | McKenna | |
| 2010/0145885 A1 | 6/2010 | Graziano et al. | |
| 2010/0204865 A1* | 8/2010 | Nakamura | B60L 1/003 348/148 |
| 2010/0231164 A1 | 9/2010 | Yang | |
| 2010/0237985 A1* | 9/2010 | Landau-Holdsworth | B60L 53/305 709/219 |
| 2010/0280675 A1 | 11/2010 | Tate, Jr. et al. | |
| 2010/0280678 A1 | 11/2010 | Tate, Jr. et al. | |
| 2010/0292877 A1* | 11/2010 | Lee | B60L 50/66 180/68.5 |
| 2010/0306033 A1 | 12/2010 | Oved et al. | |
| 2010/0320966 A1* | 12/2010 | Baxter | G06Q 20/3278 320/109 |
| 2011/0032110 A1 | 2/2011 | Taguchi | |
| 2011/0047022 A1* | 2/2011 | Walker | G06Q 10/101 705/14.35 |
| 2011/0057612 A1* | 3/2011 | Taguchi | B60L 53/30 320/109 |
| 2011/0068738 A1 | 3/2011 | Gomi et al. | |
| 2011/0095723 A1* | 4/2011 | Bhade | H01M 10/441 320/109 |
| 2011/0183733 A1 | 7/2011 | Yoshida et al. | |
| 2011/0184575 A1* | 7/2011 | Kawamoto | H04L 67/125 714/49 |
| 2011/0184580 A1 | 7/2011 | Kawamoto et al. | |
| 2011/0184585 A1* | 7/2011 | Matsuda | H04L 63/12 700/297 |
| 2011/0185196 A1* | 7/2011 | Asano | B60L 53/53 713/300 |
| 2011/0185198 A1* | 7/2011 | Ukita | H04L 67/125 713/300 |
| 2011/0204720 A1* | 8/2011 | Ruiz | B60L 53/305 307/66 |
| 2011/0316479 A1* | 12/2011 | Baxter | B60L 53/18 320/109 |
| 2011/0316482 A1* | 12/2011 | Baxter | B60L 50/40 320/109 |
| 2011/0320593 A1 | 12/2011 | Takami et al. | |
| 2012/0016546 A1 | 1/2012 | Nilssen et al. | |
| 2012/0019215 A1* | 1/2012 | Wenger | B60L 58/21 320/149 |
| 2012/0043935 A1* | 2/2012 | Dyer | B60L 58/12 320/109 |
| 2012/0106672 A1 | 5/2012 | Shelton et al. | |
| 2012/0109401 A1 | 5/2012 | Shelton et al. | |
| 2012/0109402 A1 | 5/2012 | Shelton et al. | |
| 2012/0109403 A1 | 5/2012 | Shelton et al. | |
| 2012/0109519 A1 | 5/2012 | Uyeki | |
| 2012/0109797 A1 | 5/2012 | Shelton et al. | |
| 2012/0109798 A1 | 5/2012 | Shelton et al. | |
| 2012/0123670 A1 | 5/2012 | Uyeki | |
| 2012/0133325 A1* | 5/2012 | Thomas | H02J 7/00036 320/109 |
| 2012/0173074 A1 | 7/2012 | Yasko et al. | |
| 2012/0193929 A1* | 8/2012 | Karner | B60L 53/18 294/174 |
| 2012/0197693 A1* | 8/2012 | Karner | B60L 53/31 705/14.1 |
| 2012/0197791 A1* | 8/2012 | Karner | B60L 50/30 705/40 |
| 2012/0200260 A1* | 8/2012 | Karner | H02J 3/322 320/109 |
| 2012/0232981 A1* | 9/2012 | Torossian | G06Q 20/326 705/26.1 |
| 2012/0249065 A1 | 10/2012 | Bissonette et al. | |
| 2012/0268245 A1 | 10/2012 | Alexander et al. | |
| 2012/0286730 A1 | 11/2012 | Bonny | |
| 2013/0002207 A1* | 1/2013 | Wenger | H02J 7/34 320/152 |
| 2013/0038286 A1* | 2/2013 | Thomas | H02J 7/00036 320/109 |
| 2013/0057883 A1 | 3/2013 | Ohshima et al. | |
| 2013/0110632 A1* | 5/2013 | Theurer | G06F 1/266 705/14.58 |
| 2013/0113413 A1* | 5/2013 | Harty | H01M 10/465 320/109 |
| 2013/0124320 A1* | 5/2013 | Karner | B60L 50/20 705/14.57 |
| 2013/0127416 A1* | 5/2013 | Karner | B60L 53/68 320/109 |
| 2013/0127417 A1* | 5/2013 | Karner | B60L 55/00 320/109 |
| 2013/0151293 A1* | 6/2013 | Karner | B60L 53/68 705/5 |
| 2013/0176000 A1 | 7/2013 | Bishop et al. | |
| 2013/0179057 A1 | 7/2013 | Fisher et al. | |
| 2013/0179061 A1 | 7/2013 | Gadh et al. | |
| 2013/0307382 A1* | 11/2013 | Garrison | G07F 9/001 312/215 |
| 2013/0307466 A1* | 11/2013 | Frisch | H02J 3/322 320/106 |
| 2013/0339072 A1* | 12/2013 | Touge | G06Q 10/00 705/5 |
| 2014/0002018 A1* | 1/2014 | Montemayor Cavazos | B60L 53/305 320/109 |
| 2014/0005852 A1 | 1/2014 | Asghari et al. | |
| 2014/0021908 A1 | 1/2014 | McCool et al. | |
| 2014/0028257 A1 | 1/2014 | Nishida | |
| 2014/0046707 A1* | 2/2014 | Hama | H02J 50/80 705/5 |
| 2014/0089016 A1* | 3/2014 | Smullin | G06Q 10/02 705/5 |
| 2014/0139354 A1 | 5/2014 | Miyazaki | |
| 2014/0167694 A1* | 6/2014 | Gjinali | B60L 53/50 320/109 |
| 2014/0222609 A1 | 8/2014 | Walker et al. | |
| 2014/0232338 A1 | 8/2014 | Fontana et al. | |
| 2014/0244375 A1* | 8/2014 | Kim | G06Q 30/0226 705/14.27 |

(56) References Cited

U.S. PATENT DOCUMENTS

| | | | |
|---|---|---|---|
| 2014/0266046 A1* | 9/2014 | Baxter | B60L 53/63 320/109 |
| 2014/0324737 A1 | 10/2014 | Serrano | |
| 2014/0330764 A1 | 11/2014 | Rhines et al. | |
| 2015/0032529 A1* | 1/2015 | Diachenko | G06Q 20/322 705/14.27 |
| 2015/0042168 A1* | 2/2015 | Widmer | H02J 50/90 307/104 |
| 2015/0066224 A1 | 3/2015 | Uyeki | |
| 2015/0073631 A1 | 3/2015 | Lim et al. | |
| 2015/0074994 A1* | 3/2015 | Maenishi | H05K 13/0419 29/832 |
| 2015/0127248 A1 | 5/2015 | Fisher et al. | |
| 2015/0160672 A1* | 6/2015 | Hakim | B60L 53/65 700/291 |
| 2015/0162867 A1 | 6/2015 | Meringer | |
| 2015/0183333 A1 | 7/2015 | Forbes, Jr. et al. | |
| 2015/0194833 A1 | 7/2015 | Fathollahi et al. | |
| 2015/0224888 A1* | 8/2015 | Wild | B60L 53/65 705/26.9 |
| 2015/0249353 A1* | 9/2015 | Hamilton, IV | G07F 17/0042 320/114 |
| 2015/0303692 A1 | 10/2015 | Spotti | |
| 2015/0306967 A1* | 10/2015 | Cohen | B60L 53/68 701/34.2 |
| 2015/0356587 A1 | 12/2015 | Mokwunye | |
| 2016/0082856 A1* | 3/2016 | Baxter | B60L 53/64 320/109 |
| 2016/0098770 A1* | 4/2016 | Chang | G06Q 20/145 705/26.1 |
| 2016/0099590 A1* | 4/2016 | Velderman | G07F 7/06 320/113 |
| 2016/0254698 A1 | 9/2016 | Anderson | |
| 2017/0010114 A1 | 1/2017 | Fisher et al. | |
| 2017/0013369 A1 | 1/2017 | Renken et al. | |
| 2017/0033579 A1* | 2/2017 | Maguire | H02J 7/0044 |
| 2017/0087999 A1 | 3/2017 | Miller et al. | |
| 2017/0088001 A1 | 3/2017 | Haas et al. | |
| 2017/0214245 A1 | 7/2017 | Nazarian | |
| 2017/0214263 A1 | 7/2017 | Fathollahi et al. | |
| 2017/0238238 A1* | 8/2017 | Hasegawa | H04W 60/00 455/435.1 |
| 2017/0246960 A1 | 8/2017 | Kim | |
| 2017/0282736 A1 | 10/2017 | Goei | |
| 2018/0026404 A1 | 1/2018 | Geo | |
| 2018/0034271 A1 | 2/2018 | Lam | |
| 2018/0034299 A1 | 2/2018 | Seman, Jr. et al. | |
| 2018/0065494 A1 | 3/2018 | Mastrandrea | |
| 2018/0141544 A1 | 5/2018 | Xiao et al. | |
| 2018/0141545 A1 | 5/2018 | Freytag | |
| 2018/0141562 A1 | 5/2018 | Singhal | |
| 2018/0141568 A1 | 5/2018 | Singhal et al. | |
| 2018/0143035 A1 | 5/2018 | Ricci | |
| 2018/0143298 A1 | 5/2018 | Newman | |
| 2018/0143639 A1 | 5/2018 | Singhal et al. | |
| 2018/0144369 A1 | 5/2018 | Pouliot | |
| 2018/0202825 A1* | 7/2018 | You | B60L 53/305 |
| 2018/0241228 A1 | 8/2018 | Kemppainen et al. | |
| 2018/0272874 A1 | 9/2018 | McCool et al. | |
| 2018/0375353 A1 | 12/2018 | Fathollahi et al. | |
| 2019/0006862 A1* | 1/2019 | Hamilton, IV | G07F 15/006 |
| 2019/0107406 A1 | 4/2019 | Cox et al. | |
| 2019/0226860 A1 | 7/2019 | Fisher et al. | |
| 2019/0248439 A1* | 8/2019 | Wang | B62K 11/10 |
| 2019/0255963 A1 | 8/2019 | Goei | |
| 2019/0263281 A1* | 8/2019 | Wang | B60L 53/60 |
| 2019/0308517 A1 | 10/2019 | Nishida | |
| 2019/0351783 A1 | 11/2019 | Goei | |
| 2020/0295576 A1 | 9/2020 | Kemppainen et al. | |
| 2020/0307398 A1 | 10/2020 | Shelton et al. | |
| 2021/0078434 A1 | 3/2021 | Goei et al. | |
| 2021/0080282 A1 | 3/2021 | Goei | |
| 2021/0142411 A1 | 5/2021 | Forbes, Jr. et al. | |
| 2021/0182911 A1 | 6/2021 | Xiao et al. | |
| 2021/0197682 A1 | 7/2021 | Goei | |
| 2021/0201357 A1 | 7/2021 | Singhal et al. | |
| 2021/0394631 A1 | 12/2021 | McCool et al. | |
| 2021/0394632 A1 | 12/2021 | McCool et al. | |
| 2022/0111747 A1 | 4/2022 | Goei et al. | |
| 2022/0153156 A1 | 5/2022 | Goei et al. | |
| 2022/0332210 A1 | 10/2022 | Goei | |

OTHER PUBLICATIONS

Canadian Intellectual Property Office: Examiners Report of Canadian Application 3019622 (related application); Bill Halloran; dated Mar. 14, 2023; 7 pages.

Patent Cooperation Treaty: International Preliminary Report on Patentability of PCT/US20/62182 (related application); Athina Nickitas-Etienne; dated May 17, 2022; 10 pages.

PCT: International Search Report and Written Opinion of PCT/US20/62182 (related application); dated Feb. 24, 2021; 12 pgs.

Rowe et al. "Sensor Andrew: Large-scale campus-wide sensing and actuation." In: IBM Journal of Research and Development. Mar. 2011 (Mar. 2011) Retrieved on Jan. 23, 2021.

Australian Patent Office: Examination Report of AU 2022256221 (related application); dated Sep. 7, 2023; 3 pages.

* cited by examiner

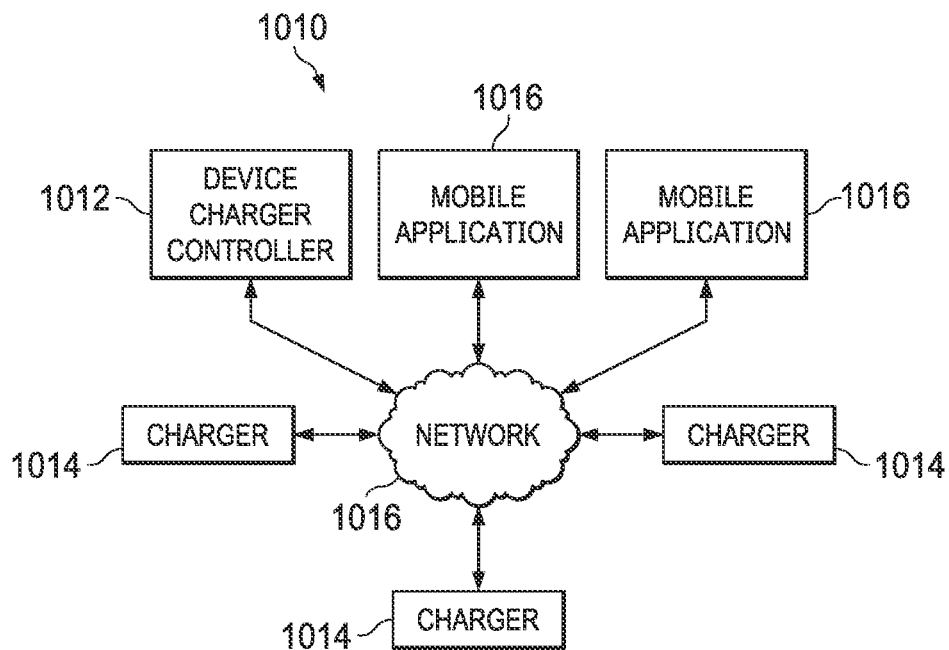
FIG. 10
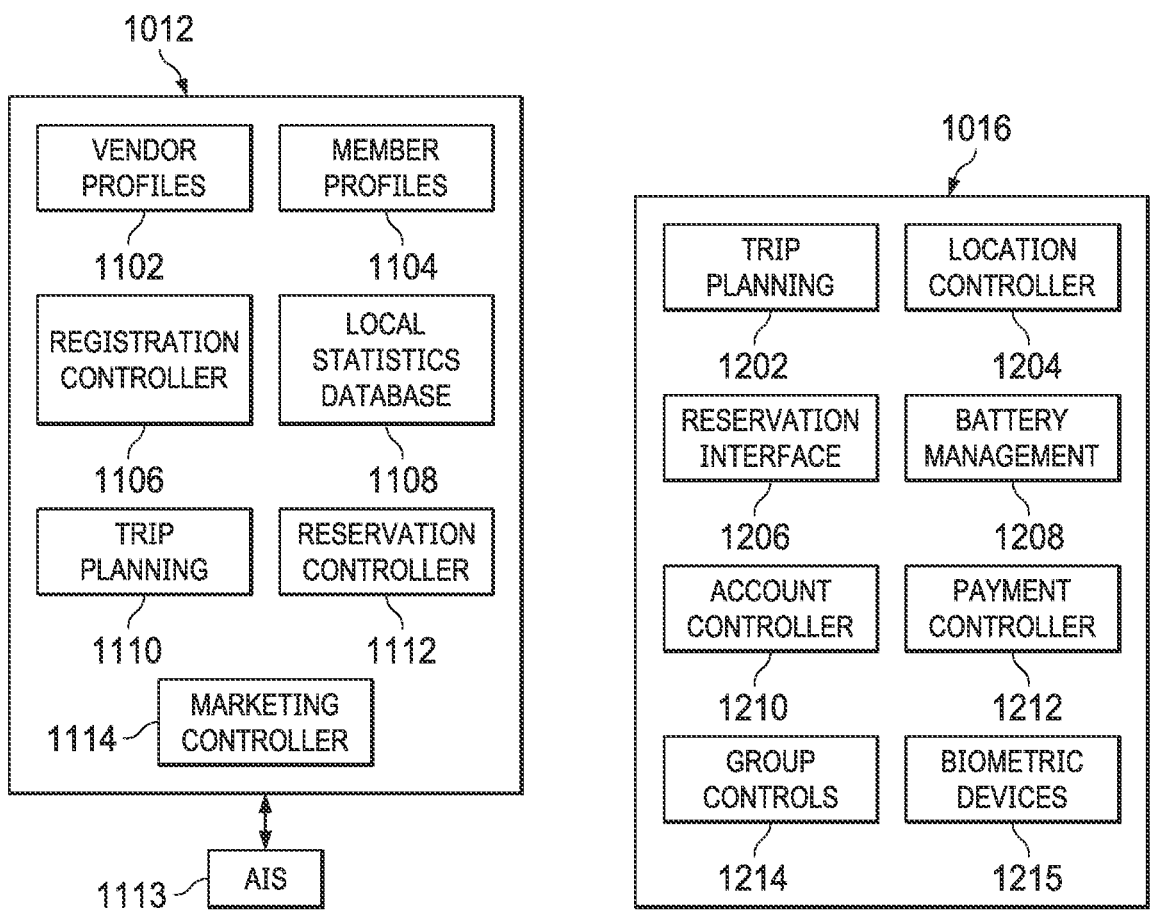
FIG. 11
FIG. 12

UNIVERSAL AUTOMATED SYSTEM FOR IDENTIFYING, REGISTERING AND VERIFYING THE EXISTENCE, LOCATION AND CHARACTERISTICS OF ELECTRIC AND OTHER POWER OUTLETS BY RANDOM USERS AND FOR RETRIEVAL AND UTILIZATION OF SUCH PARAMETRIC DATA AND OUTLETS BY ALL USERS

CROSS-REFERENCE TO RELATED APPLICATIONS

This application is a Continuation of U.S. patent application Ser. No. 17/104,123, filed Nov. 25, 2020, entitled A UNIVERSAL AUTOMATED SYSTEM FOR IDENTIFYING, REGISTERING AND VERIFYING THE EXISTENCE, LOCATION AND CHARACTERISTICS OF ELECTRIC AND OTHER POWER OUTLETS BY RANDOM USERS AND FOR RETRIEVAL AND UTILIZATION OF SUCH PARAMETRIC DATA AND OUTLETS BY ALL USERS. U.S. patent application Ser. No. 17/104,123 claims benefit of U.S. Provisional Application No. 62/940,004, filed Nov. 25, 2019, entitled A UNIVERSAL AUTOMATED SYSTEM FOR IDENTIFYING, REGISTERING AND VERIFYING THE EXISTENCE, LOCATION AND CHARACTERISTICS OF ELECTRIC AND OTHER POWER OUTLETS BY RANDOM USERS AND FOR RETRIEVAL AND UTILIZATION OF SUCH PARAMETRIC DATA AND OUTLETS BY ALL USERS, U.S. patent application Ser. No. 17/104,123 is also a continuation-in-part of U.S. patent application Ser. No. 15/477,669, filed Apr. 3, 2017, entitled AUTOMATED SYSTEM FOR MANAGING AND PROVIDING A NETWORK OF CHARGING STATIONS, issued as U.S. Pat. No. 10,857,902 on Dec. 8, 2020, which is incorporated by reference herein in its entirety.

TECHNICAL FIELD

The present invention relates to charging outlets for electrical and electronic devices as well as outlets that deliver other forms of energy, and more particularly to a system and method for identifying, registering and verifying charging outlets for electrical and electronic devices as well as outlets that deliver other forms of energy.

BACKGROUND

The proliferation of electrical and electronic devices particularly portable and transportable ones that run on battery power or other mobile power sources are ever-increasing. When a user of an electrical or electronic device needs power there is no easy way to search online for an available compatible power source. The user must currently search for an available outlet that they can access in their area and this can be a hit and miss proposition at best, and the outlet may either be in use or inoperable. A system for tracking and identifying power outlets for users of electrical and electronic devices in order to enable them to locate and connect to the outlet for the purpose of charging their devices would be greatly beneficial.

SUMMARY

The present invention, as disclosed and described herein, comprises in one embodiment, a system for registering power outlets for electric vehicle charging that may be used to charge electric vehicles. A database stores subscriber data relating to subscribers registered with the system and power outlet data relating to registered power outlets for electric vehicle charging that have been located by a reporting entity. A server provides a power outlet management system that receives the power outlet data for a power outlet for electric vehicle charging from the reporting entity, registers the power outlet for electric vehicle charging with the power outlet management system if the power outlet electric vehicle charging has not previously been registered and stores the power outlet data for the power outlet for electric vehicle charging in the database. The server is further configured to receive a search request for a useable power outlet for electric vehicle charging from a subscriber, the search request including location information defining an area of search for the useable power outlet for electric vehicle charging, locate at least one power outlet for electric vehicle charging within the area of search that is registered with the power outlet management system and provide a location of the at least one power outlet for electric vehicle charging located within the area of search to the subscriber. A network interface for connecting the server to a network for receiving the power outlet data and the search request.

BRIEF DESCRIPTION OF THE DRAWINGS

For a more complete understanding, reference is now made to the following description taken in conjunction with the accompanying Drawings in which:

FIG. 10 illustrates a medical/mobility device charging management system;

FIG. 11 is a block diagram of a central management server of a medical/mobility device charging management system;

FIG. 12 is a block diagram of a user application of a medical/mobility device charging management system;

DETAILED DESCRIPTION

Figure 1:
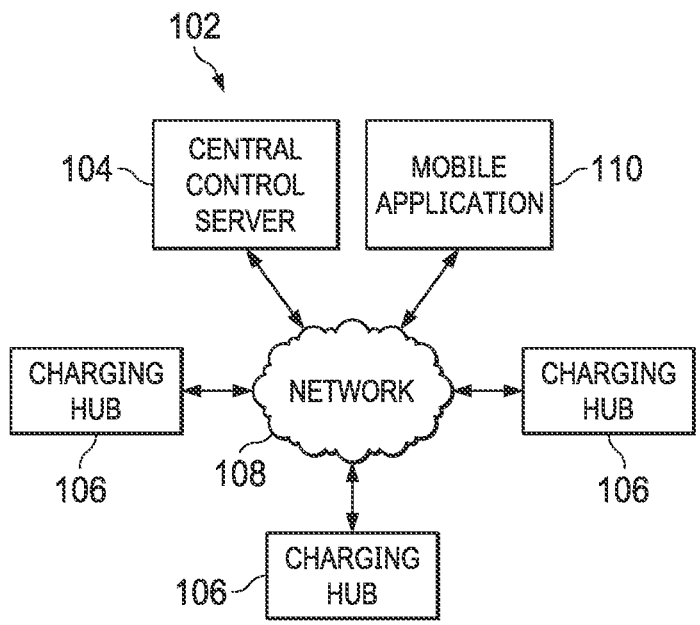
FIG. 1 illustrates a generic system for managing and reserving charging stations.

Referring now to the drawings, wherein like reference numbers are used herein to designate like elements throughout, the various views and embodiments of a universal automated system for identifying, registering and verifying the existence, location and characteristics of electric and other power outlets by random users and for retrieval and utilization of such parametric data and outlets by all users are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1 illustrates a generic representation of an electrical device charging management system 102. The system 102 includes a central control server 104 that is responsible for providing centralized management of the charging management system responsive to a variety of system inputs. The central control server 104 manages a number of charging hubs 106 with which it communicates via a network 108 such as the Internet. The charging hubs 106 include one or more charging ports that enable an electrically powered device to be connected and charged. The central control server 104 stores a variety of information related to registered system users and their associated electrically powered devices that are to be charged at the charging hubs 106. The information collected and stored can be used for reserving charging hubs 106, controlling the charging periods of the electrically powered device connected to the charging hub 106 and for enabling payment of charging services provided by the charging hubs. The users of the system are able to interact with the central control server 104 using a mobile application 110 that is stored upon a mobile device such as a smart phone, a tablet, a laptop, personal data assistants, etc. that belongs to the user and provides the ability to interconnect with the central control server 104 via the connecting network 108 such as the Internet. The mobile application 110 would be downloaded onto the users communication device, and the user would register with the central control server 104 enabling the user to make reservations and find information with respect to the variety of charging hubs 106 that are a part of the charging management system 102 or which may be owned by other vendors that are compatible with the system. In such cases the system may only provide management and accounting and payment processes. The mobile application 110 would also enable new vendors that offer the services of charging units to register with the system.

Figure 2:
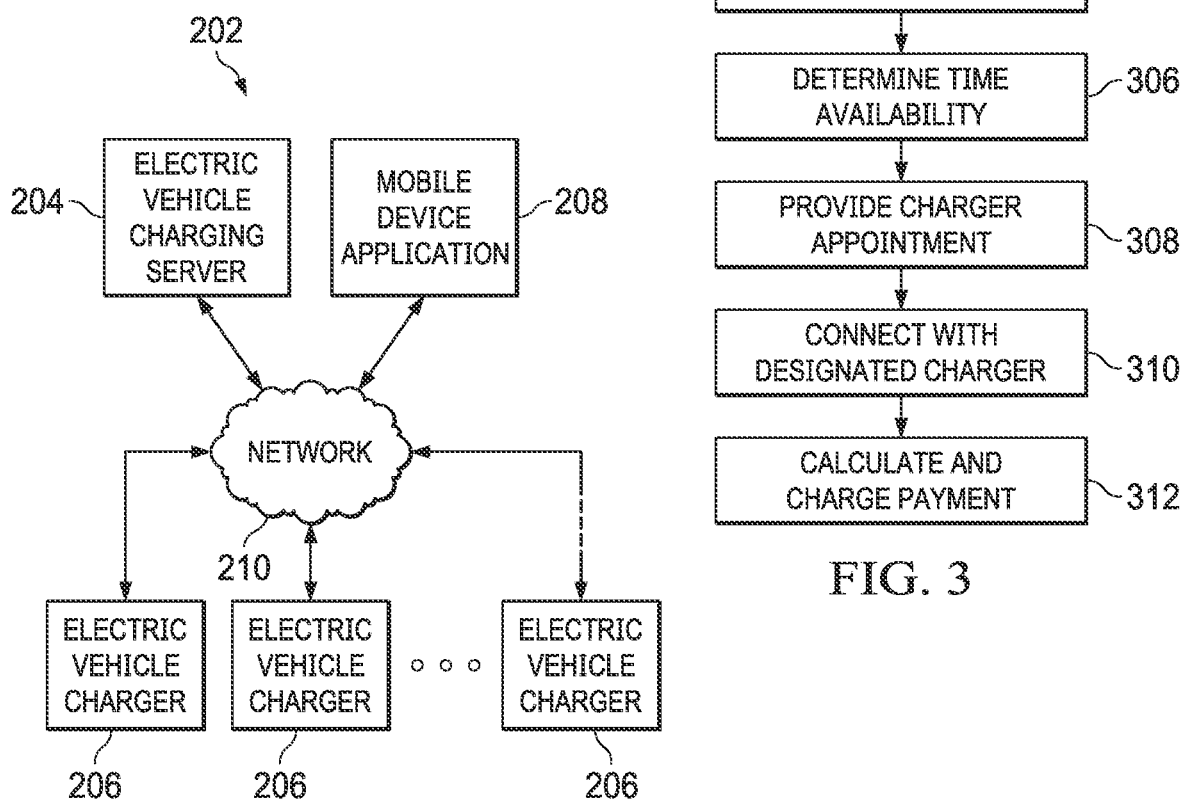
FIG. 2 illustrates an electric vehicle charging management system.

Referring now to FIG. 2, there is more particularly illustrated one embodiment of a charging management system 202 for electric vehicles. The system 202 provides closed loop accounting of the electric vehicle charging process starting from matching the electric vehicle to the charger unit 206, reserving the charger unit, engaging the charger unit, measuring the electricity delivered from the charger unit and collecting and dispersing payment. The electric vehicle charging management system 202 includes an electric vehicle charging control server 204 that controls and manages all system operations enabling user devices to make reservations, connect with and control charging with a variety of electrical vehicle chargers 206. The control server 204 may further enable charging of electrical vehicles by appointment or charging by reservation of other types of electric devices. The charging management and reservation system 202 could just as well be applied to non-electric powered vehicles that utilize other types of fuel for power generation such as hydrogen fuel which requires recharging of hydrogen tanks and even gasoline powered cars may benefit from a mechanism for reserving gasoline pumps in certain circumstances such as gasoline rationing which occurred in prior periods of energy crisis. The electric vehicle users are able to interact with the system 202 using a mobile device application 208 installed, for example, on their smartphone. As discussed before, interactions between the control server 204, charging units 206 and mobile device application 108 occur over a central network 210 such as the Internet. A particular electrical vehicle charging unit 206 can provide the chargers and appropriate connections for one or more types of electrical vehicles, such as golf carts, electric bikes (e-Bikes) electric motorized wheelchairs, electric shopping carts, etc.

The growing deployment of electric vehicles create a need for widespread electrical charging stations 206 that are conveniently and strategically located at points of interest. The control server 204 enables a network of charging stations 206 to be managed within a wireless/wired automated environment enabling individuals and/or owners of specific brands of electrical vehicles to rent out their chargers 206 for charging compatible electric vehicles. For example, an owner of a Tesla can offer other Tesla drivers the use of their home/premises charging apparatus for a designated fee. The management system 202 is able to match a user with a particular charging station 206 by way of the mobile device application 208. The mobile device application 208 in addition to matching users with charging stations 206 makes use of the central management control system server 204 via the network 210 to enable the dispensation of electricity to the electric vehicles, control various electricity-metering apparatus and provide for an automated reservation, billing and payment processing mechanism for payment of use of the electrical vehicle chargers 206 to enable owners of the electrical vehicle chargers 206 to become a part of the charging management system 202.

Figure 3:
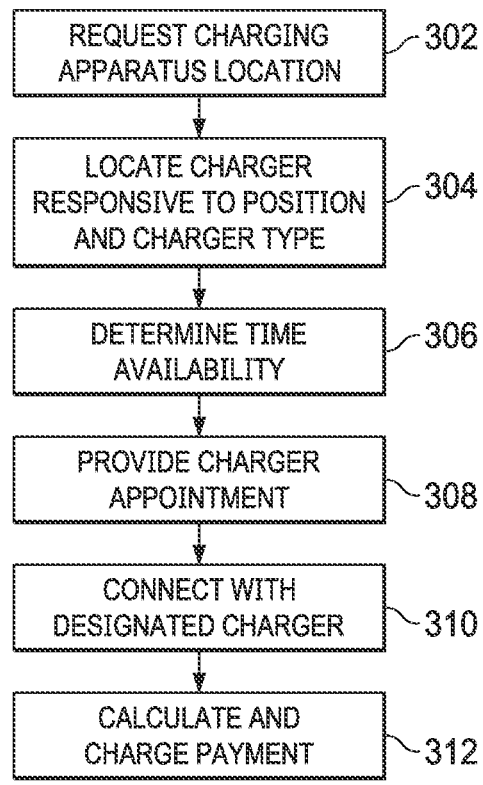
FIG. 3 is a flow diagram illustrating a process for using the electric vehicle charging management system.

Referring now to FIG. 3, there is illustrated a flow diagram describing the use of an electric vehicle charging management system 202 as discussed with respect to FIG. 2. Through the mobile device application 208, a user of an electric vehicle request at step 302 a location of a electric vehicle charger unit 206 that is compatible with their brand of vehicle. The charging control server 204 matches the vehicle to one or more appropriate vehicle chargers 206 at step 304 responsive to the position of the vehicle and the type of charger required to charge the vehicle. Next, the availability of the located chargers 206 is determined at step 306 to determine which of the chargers is available for charging of the vehicle. The time availability may be based upon a requested time or a projected time based upon the user's travel plan. Upon confirmation of the availability of the charging units 206, the user is to select one of the available charging units 206 and an appointment with the specific charging unit 206 is made by the charging control server 204, and the driver is notified of this appointment through their mobile application 208. Alternatively, the user may elect to allow the system to select one of the many available 206 chargers pursuant to preset user preferences or to a system provided artificial intelligence system (AIS) which makes the election for them. Part of the appointment process may involve a full or partial payment being made by the drivers account subject to the charging functionalities of the charging control server 204. The driver may then travel to the designated charging unit 206 to obtain the vehicle charge.

Upon arrival at the designated charging unit 206 the user is validated and authorized to use the unit by mobile application 110, and the vehicle is connected at step 310 with the designated charger that has been predetermined to be compatible with the particular electric vehicle brand that needs charging. Based on published utility rates, the amount of electricity consumed during the charge process and the location of the charging unit 206, the charging control server 204 can determine the amount to be collected from the registered driver's credit card or other registered payment sources such as PayPal at step 312 to complete payment for the charging services. Determination of electricity consumption can be facilitated by several means and mechanisms including in-line metering within the charging circuit to the electric vehicle or from data generated by the electric vehicle which may be accessible via Bluetooth or other wireless transmissions. With the advent of smart metering capability installed by utilities to monitor on premise electricity usage the electricity consumed via users using our system such information may be transmitted to our system for usage accounting and billing. Alternatively, the charging profiles from the electric vehicle manufacturer could be automatically referenced to generate an estimate of the electricity consumption that can be billed to the drivers charging accounts for collection.

Figure 4:
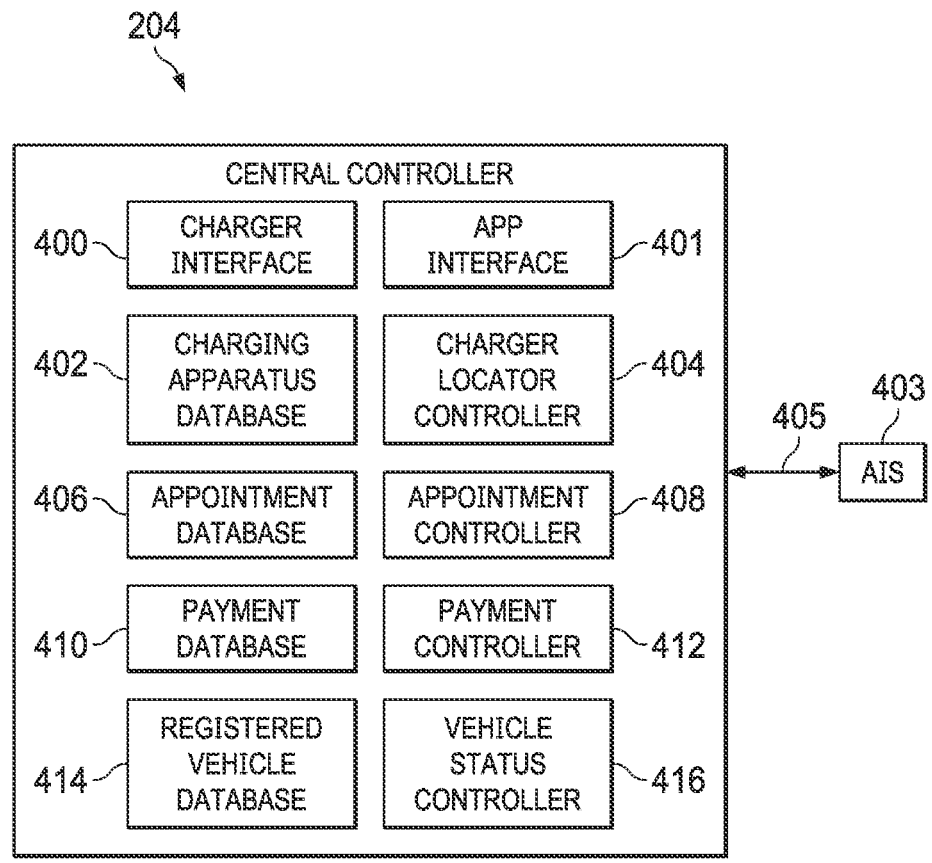
FIG. 4 is a block diagram of a central controller of an electric vehicle charging management system.

Referring now to FIG. 4, there is illustrated a functional block diagram of the electric vehicle charging server 204. A charger interface 400 enables communications between the charging server 204 and a plurality of charging units 206 for charging the at least one electric vehicle. An application interface 401 enables communications between the central personal mobility device charge controller 204 and a plurality of charging applications enabling finding locations of at least one of the plurality of charging units 206 and making reservations with the charging units. The charging control server 204 includes a charging apparatus database 402 that includes all of the electrical vehicle charging units 206 that have registered with the system for providing charging locations for electric vehicles. The database 402 includes information such as number of charging ports and the types of electric vehicles for which the charging units 206 may be used. Databases within the charging controller server 204 comprise databases that provide data for performing complex real-time matching of the location of an electric vehicle on the road and searching for a charging unit 206 to determine the charging unit that is closest to the vehicle using the charger locator controller 404. More complex matching requests may incorporate destination routing referencing so that the electric vehicle may select a charger that is along the way to the electric vehicle's destination. The database 402 may also store information related to the registered electric vehicle such as the last time the electric vehicle was charged, the state of charge to enable the system to estimate the battery exhaustion time and recommended charging locations that an electric vehicle could reach before running out of power. A charger locator controller 404 determines charging units 206 that may possibly be utilized for charging the electrical vehicle based upon information stored within the charging apparatus database 402 and vehicle position and type information provided from the mobile device application 208 of the driver of the electric vehicle. In addition, a link 405 to an artificial intelligence system (AIS) 403 may be provided for the purpose of providing more sophisticated trip planning that incorporates various biometric data that may prompt more frequent stops for health necessities or prior user trip patterns. The AIS 403 may make decisions regarding trip planning without requiring specific user input but by only relying upon provided or monitored system information.

An appointment database 406 stores information for charging appointments that are made by vehicle drivers with respect to particular charging units 206. The appointment database 406 indicates a charging unit 206 and times that the charging unit is presently scheduled to be charging a particular vehicle. An appointment controller 408 generates a listing of possible appointment times for a charging unit 206 to the mobile device application 208 responsive to a user request and receives and stores a user selection for a particular appointment time for a charging unit 206 that a driver has selected.

A payment database 410 stores payment information for registered system users. The payment database 410 stores information such as credit card data to enable payment for charging sessions or PayPal information to enable for charging session payment. The payment controller 412 controls interactions with the mobile device application 208, charging information within the charging control server 204 and the vendor accounts for the charging unit 206, and enable transfer of funds from a charging vehicle user to a vendor responsible for the charging unit 206 providing a charging session. Various payment schemes may be stored in database 410 such as the use of stored credit resulting from advance deposits or some protocol for a system of membership debits and credits whereby members may opt to accumulate credits by provide charging service to other registered members and are debited when they consume electricity at a registered charging unit 206.

The registered vehicle database 414 maintains information concerning registered users with the system 102. Each registered user would have information concerning their vehicle type enabling assistance in selection of charging units 206 appropriate for that vehicle type. Additionally, the database 414 would include information tying the vehicle to particular charging information and other user or vehicle relevant information. The vehicle status controller 416 monitors operation of the charging operation by a charging unit 206 to which an electric vehicle is connected. The charging status controller 416 can monitor the links of a charge and monitor for conditions indicating that ceasing of the battery charge is necessary due to completion of charging or problem issues requiring ceasing of battery charge.

Figure 5:
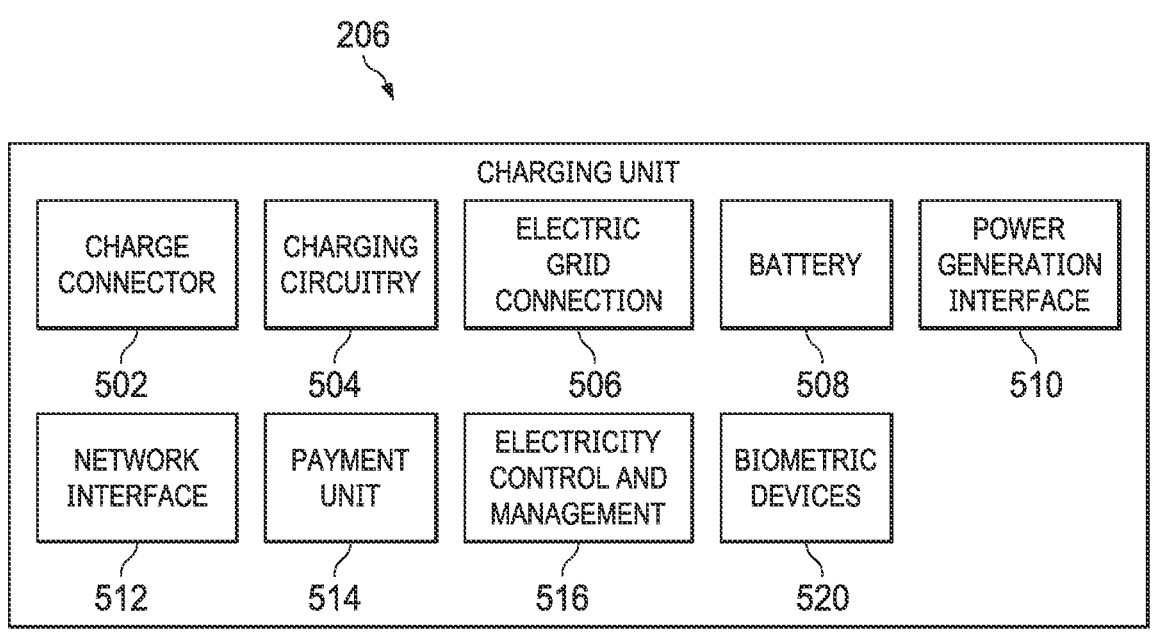
FIG. 5 illustrates a block diagram of a charging unit of an electric vehicle charging management system.

FIG. 5 illustrates a functional block diagram of the charging unit 206. Charging units 206 are available in three classes of performance, level I and II are for installations where single phase AC power is available. Level III electronic charging units are required for quick charging of electronic vehicles. Level III charging units utilize three-phase AC power which is usually only available at a business or commercial premises. A typical level I or level II charger will currently fully charge an electric vehicle in several hours depending on the EV's battery capacity and state of charge. The charging unit 206 will include a charge connector 502 for connecting one or more different types of electric vehicle to charging circuitry 504. The charging circuitry 504 generates the charging voltage and current provided to the vehicle. The charge connector 502 can be a single or multiple vehicle connection depending upon the capabilities of the charging unit 206. The charge connector 502 may comprise, but is not limited to, NEMA 15, Tesla, NEMA 50, J1772, SAE Combo, CHADeMO, NEMA 20, etc. connectors.

Figures 18, 19:
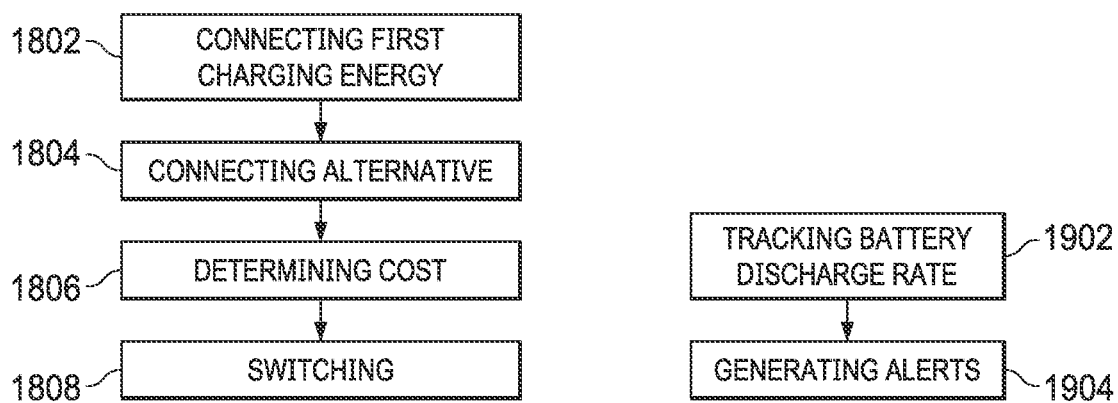
FIG. 18 illustrates a flow chart for switching based on source cost.
FIG. 19 illustrates a flow chart for generating alerts.

Charging circuitry 504 utilizes power from either the local power grid or a local stored power source, such as a battery or capacitance device, to generate a charging current that is output via the charge connector 502 to the electric vehicle being charged. The charging circuitry 504 can receive the charging power from either the electrical power grid via an electric grid connection 506 or a local battery 508. The electric grid connection 506 would comprise a standard power interface to the local power grid. A battery 508 would locally store electricity that was provided via some type of power generation interface 510 or from the electric grid connection 506. The power generation interface 510 could be connected to a solar, wind or other type of power generation system. Alternatively, the system could switch between the alternative power generation interface 510 and the electric grid connection 506 based in one instance upon low tariff periods from the electricity grid. Thus, the charging unit 206 would connect to the electric grid during low tariff times and utilize the alternative power generation interface 510 during higher tariff times. This is more fully illustrated in FIG. 18. The charging unit is connected to the power grid at step 1802 to provide first charging energy to the connected electrical device. The charging unit to an alternative electrical energy source network at step 1804 to provide second charging energy to the connected personal mobility device. A cost of the first charging energy and the second charging energy is determined at step 1806. The first charging energy and the second charging energy to the connected personal mobility device are switched between at step 1808 responsive to the cost of the first charging energy and the second charging energy or some other criteria.

A network interface 512 provides for a wireless or wired connection to the charging control server 204 to enable communications and operations occurring between the databases and controllers therein and the control functionalities within the charging unit 206. The network interface 512 may utilize powerline communications technologies and/or wireless technologies such as Wi-Fi, 3G/4G/5G data services, GPSS and other mapping technologies. A payment unit 514 comprises an interface for manually entering user information or a credit card reader enabling the taking of point of sale payment information from a driver that use the charger to charge their electric vehicle. Payment may be taken via cash, check or credit card using the appropriate payment collection protocols, or even membership debits and credits.

Each of the system components are under control of an electricity control and management unit 516 that is responsible for controlling all inter-charging unit operations and operations between the charging unit 206 and the charging control server 204. The electricity control and management unit 516 enables the dispensation of electricity, detects the amount of electricity consumed and transmits this information through the network 210 using mechanisms such as powerline communications, and/or Wi-Fi or 3G/4G/5G data networks to the central controller 204 for storage within the various databases. The electricity control and management module 516 includes current sensors or other energy monitoring devices on the AC lines connected to the charging vehicle to measure the level of charge being delivered and provide electronic clocks that may be used to measure the duration of electricity dispensation. Information collected, used and transmitted during and after the matching process includes data on the electric vehicle connector type, the charging units characteristics, local utility electricity rates, electric vehicle identification protocols, dispensation duration, as well as characteristics of the charger behavior which may affect maintenance of the charger, etc. Alternatively, a fixed amount of charge can be implemented in discrete blocks of time, for example 30-minute increments, to control the electricity dispensation using a simple timer switch.

Biometric devices 520 may also be used for validating a user connecting with the charging unit 206 and enabling initiation of the charging process. The biometric devices 520 may comprise devices such as fingerprint scanners, voice recognition devices, retinal scanners, etc.

Figure 6:
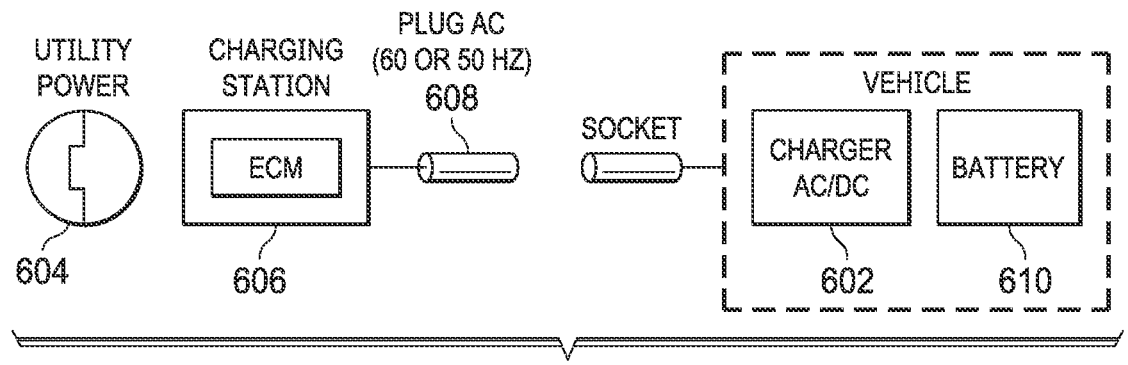
FIG. 6 illustrates an AC coupled charging unit.
Figure 7:
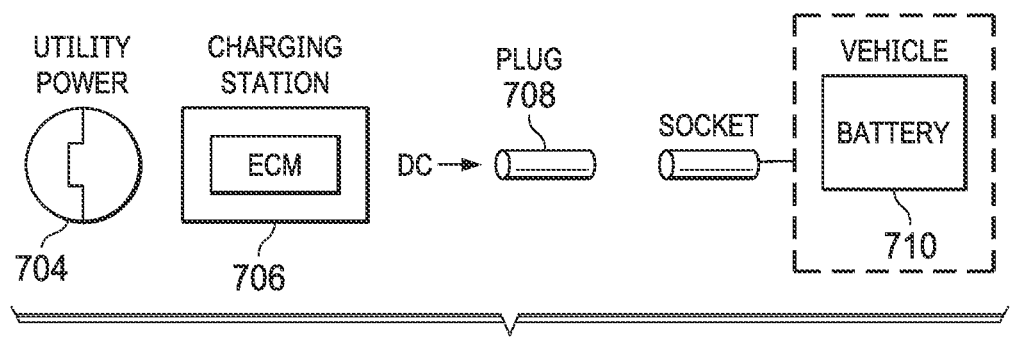
FIG. 7 illustrates a DC coupled charging unit.
Figure 8:
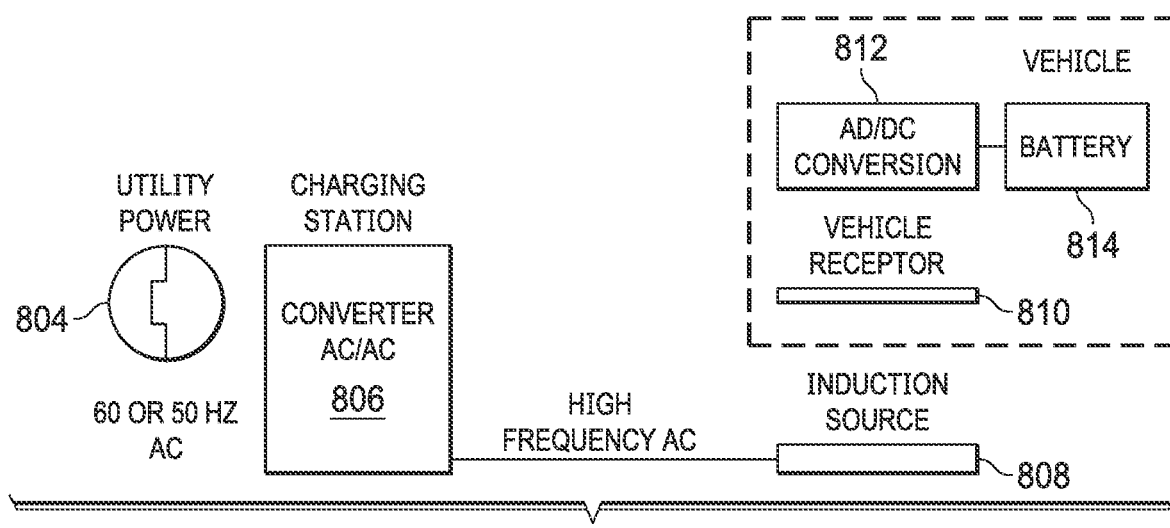
FIG. 8 illustrates an inductively coupled charging unit.

Referring now to FIGS. 6-8, there are illustrated components of the system for three different modes of coupling between the electric vehicle with a converter depending on the electric vehicle's onboard electricity storage system. As shown in FIG. 6, if the electric vehicle has a built-in converter 602 to convert the incoming AC power from the utility power 604 into DC power, the charging station 606 only needs to output AC power with the appropriate connector plug 608 voltage to charge the battery 610. If the electric vehicle requires DC power for charging, the electric power provided from the charging station 706 responsive to the utility power 704 comes from a DC power output mechanism at the appropriate voltage from the connector plug 708. The plug connection 708 provides the DC charging voltage directly to the battery 710.

In addition to the directly coupled electric vehicle charging configurations of FIGS. 6 and 7, an inductive charging system may be used wherein the utility power 804 provided to the charging station 806 is inductively coupled to a vehicle through an induction source 808 and vehicle receptor 810. An AC to DC conversion unit 812 within the vehicle converts the AC power into a DC component for charging the battery 814. Note that all three charging situations of FIGS. 6-8 utilize a charging station including an electricity control and management system 516 that provides the necessary electrical power conversion and regulation as necessary, turns the charging power on/off, measures the amount of electricity dispensed and performs other control functions such as monitoring the charge data gathered from the vehicle during charging. Such data may be gathered wirelessly or via a connecting cable that connects the electric vehicle to the charging unit.

Figure 9:
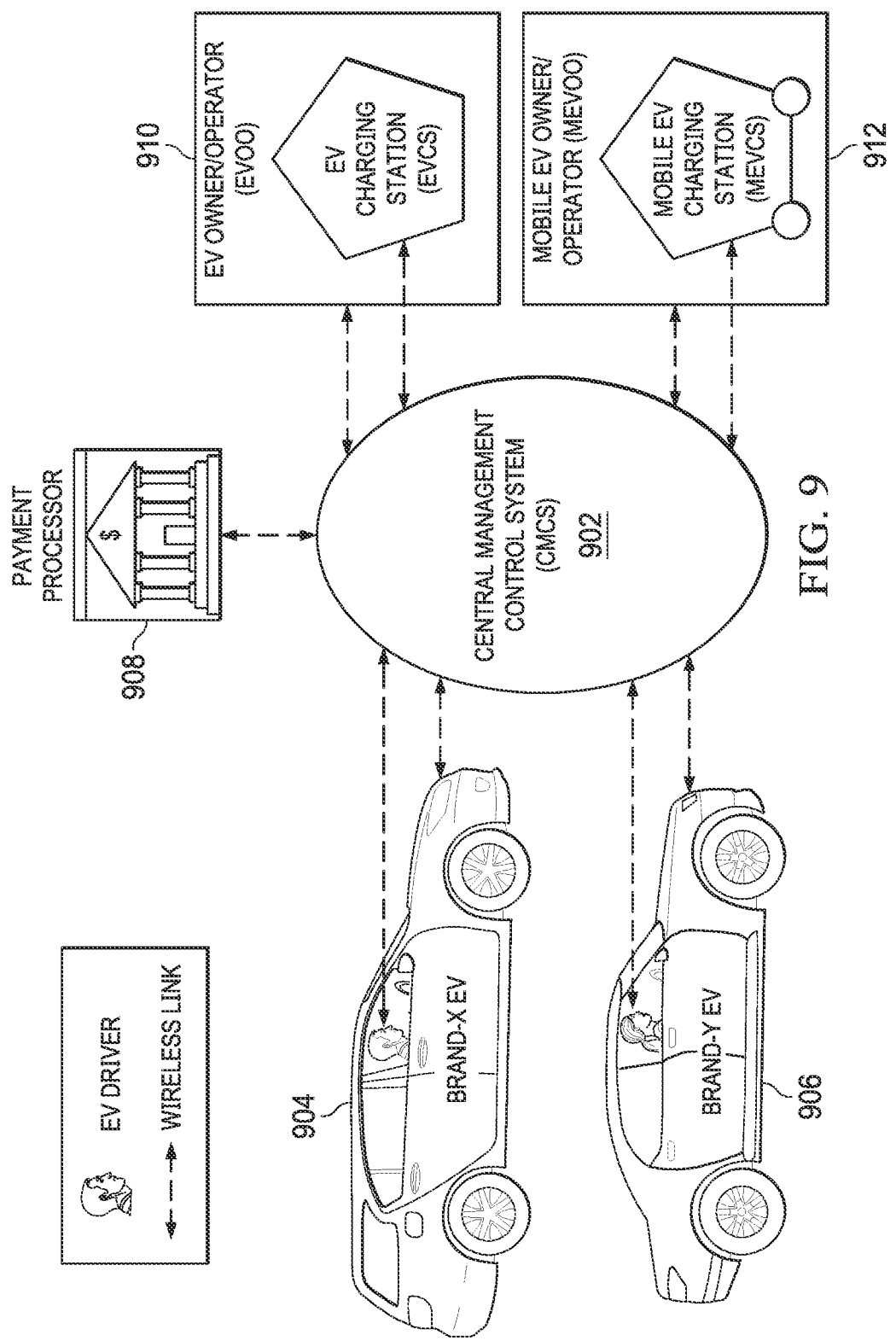
FIG. 9 illustrates a central management control system and its interaction with electric vehicle charging management system components.

FIG. 9 illustrates the main components of the charging system of FIG. 2 wherein the various components are wirelessly communicating with the electric vehicle charging server 202 which is further illustrated as the Central Management Control System (CMCS) 902. The CMCS 902 is the brains of the system and maintains a database of components including the profiles of the drivers and the charging units along with the locations of the charging units. The CMCS 902 monitors each transaction from start to finish, records the time of charging, performs payment processing and continuously collects information from the network components. The CMCS 902 wirelessly connects to different brands of electric vehicles 904, 906 through the mobile application and with the payment processor 908 to carry out payment for charging services. Further wireless connections may be between the owners and operators of various electric charging stations 910 at fixed locations or mobile electric charging stations 912 that may actually rendezvous with stranded vehicles to provide charging through mobile or transportable power storage systems. The mobile chargers 912 utilize portable storage devices or generators enabling the mobile system to move its operations as desired and move the charger to seek revenue opportunities by transporting the stored energy to a location that may have need of services, such as an electric vehicle rally, county fair, golf course or tournament where electric carts need charging, etc, or wherever electricity might be needed. By coupling portable energy collection sources such as solar panels, a mobile charger 912 could operate indefinitely away from a power grid. These mobile chargers 912 provide a roving charging station on a moving platform such as a truck equipped with fossil fuel motorized electric generators or a bank of batteries that are either charged from the normal grid outlet such as 110 V AC wall circuit and/or are continuously charged on the road via portable solar panels or energy collection mechanism such as wind turbines or the vehicles' auxiliary electric power output.

The electric vehicle network management and charging system 202 provides the ability to match brand specific electronic vehicles with brand compatible charging units and schedule an electric vehicle charging session. The system 202 also provides the means of matching and enabling non-electric vehicle owners who buy third party charging units to become independent operators operating on their own schedule to provide charging services. The system 202 will deliver the same transaction experience to those using brand specific electric vehicles and charging units by scheduling the transaction, measuring/metering and dispensing the electricity consumed, collecting and dispersing payment for consumption, recording the incident and tracking the process. The system 202 will provide for electronic recordkeeping and payment processing. Payment mechanisms are universally available from third parties including the use of on-site magnetic card readers, smart chip card readers and even online Internet data entry through third-party portals for payment processing. Prepayment options are also available by pre-registering the electronic vehicles payment options which then merely require the completion of agreed-upon payment protocols.

In another embodiment, the system may utilize modules of removable batteries wherein electric vehicle may simply exchange charge depleted batteries for a set of fully charged batteries, and thus eliminate the waiting time associated with charging the electric vehicles' onboard batteries. When such electric vehicles are available as well as the battery modules, the system will utilize a battery exchange system to exchange batteries using the mobile applications and CMCS described herein above with such modular batteries that are matched with their particular electric vehicle that may accept the batteries.

Referring now to FIG. 10, there is illustrated an alternative embodiment of a system 1010 for managing a network of charging stations for personal mobility devices and personal medical devices. The system 1010 includes a central device charger controller 1012 that controls all charging operations between a plurality of charging units 1014 through a network 1016, such as the Internet. Individual users may establish appointments with the various charging units 1014 using a mobile application 1016 stored on their personal mobile devices. The mobile application 106 communicates with the central device charger controller 1012 and charging units 1014 through the network 1016. The system 1010 enables and facilitates the charging of electric devices at locations which provide charging facilities that can be reserved for use at predetermined times or opportunistically as availability permits. The charging units 1014 are provided at locations in or around where a user intends to engage in some activity such as those offered at recreational or food and beverage sites among other establishments, or in general where the user intends or expects to be spending an extended length of time to allow for an effective charging cycle. However, the system 1010 is not restricted to such fixed locations as such charging units 1014 may be rented out by the owner or operator for use at the user's option and pleasure by packaging such units 1014 as swappable batteries for use in the users' devices as described herein above.

The network of charging stations 1014 are located within or near the property of a service provider such as a restaurant, cinema, concert hall, etc., or are transportable and can be reserved by a personal mobility device user prior to the user's visit at a particular vendor location. The user makes reservations for use of a charging unit 1014 via the mobile application 1016 which enables the user to connect to the central device charger controller 1012. The charging unit 1014 contains electronics and switches that control the dispensation of an electric charging current to the subscribing user's personal mobility device under control of a central control module having functions that are incorporated within the charging unit 1014. Each charging unit 1014 may contain several connectors that can be controlled from a single centralized controller within the charging unit 1014. Each connector may have different connector configurations for connecting with different devices having different charging protocols.

The mobile application 1016 provides position information using various applications such as GPSS applications, cell tower triangulation techniques or using location sensitive beaconing technologies such as Apple Computer's Bluetooth app iBeacon or other commercial beaconing technologies. Typically, the application 1016 is downloaded to a mobile communications device such as a smart phone or electronic tablet. The application 1016 and central device charger controller 1012 enable the system to employ Internet of Things (IOT) protocols and methods to enable and provide for a range of services to the user who subscribes via online registration through the application.

The system 1010 uses the network 1016 to provide shared computer and communication resources and to maintain databases within the device charger controller 1012, as will be described more fully herein below, for all subscribing vendors and system subscribers. Before registering a vendor, the vendor's venue must be audited as to the feasibility of providing charging unit services. The vendor must have Internet connectivity to become part of the system and may opt for other wireless communications methods such as Wi-Fi, and/or Apple computers app iBeacon that facilitates sending digital beacon messages from the vendor to the user. The vendor must also set aside or install specific electrical outlets and space to accommodate the secure parking of one or more personal mobility devices or charging bays for personal medical devices at their premises or venue. The vendor would initiate the registration process using a mobile application 1016 in a similar manner that a new user would register with the system.

The installation of a beacon-like application on the user's smart device enables the system to provide the user with enhanced services. The electricity provided through the designated outlets is accessed, controlled and regulated via a device and/or software either within the vendor's premises equipment or in an external apparatus that connects with the system. The vendor, such as a restaurant operator that caters to electric wheelchair users, would designate specific wheelchair accessible tables which either incorporate one or more charging ports or in some cases the vendor might deploy their charging units at convenient personal mobility device parking areas provided the vendor also has a means for enabling the visiting user to be transported to the activity venue. All such information is part of the specific event profile and may be displayed on the user's mobile application 1012.

The charging unit 1014 employs Internet of things (IOT) technology to communicate with the central device charger management controller 1012 either directly or via the central management controller that controls one or more charging units 1014. The charging unit 1014 also communicates with the personal mobility device in such cases wherein the personal mobility device has built-in communications capability such as Bluetooth or Wi-Fi. In such cases, there may be a need to cooperate with the specific personal mobility device manufacturer in order to obtain the personal mobility devices API (application program interface). Access to such APIs may be required to enable the system's sophisticated features such as trip planning so that the system can determine the real time charge state of the personal mobility devices battery and average speed of travel among other measurement parameters.

The system 1010 incorporates other positioning technologies for such purposes including beaconing technologies and wheel mounted odometers to enable the determination of distances traveled by the personal mobility device based on revolutions of the wheel. Other means of providing such information may utilize third-party apps such as Google maps whereby the system can derive the personal mobility devices position and travel progress via the user's smart phone GPSS system. IOT capability may be deployed in several elements of the vendor's equipment portfolio. Other methods and apparatuses may be used to garner the necessary personal mobility device travel and battery state data as well as the user's biometric data so as to determine the distance traveled for example, and/or whether intervention is required by the user or device. Additionally, the central management controller would measure the quantity of electricity consumed by the personal mobility device during the charging session.

Figure 17:
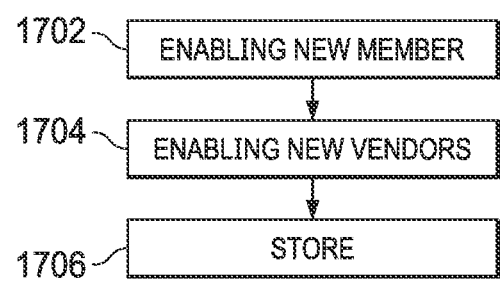
FIG. 17 illustrates a flow chart for profile storage.

Referring now to FIGS. 11 and 17, there is illustrated a functional block diagram of the central device charger controller 1012. The controller 1012 includes databases of vendor profiles 1102 and member profiles 1104. The vendor profiles 1102 store information concerning charging units 1014, and the individuals controlling operation of the charging units. The member profiles 1104 include information about users who have registered their personal mobility devices, personal medical devices or other electronic devices through the device charger controller 1012 and charging units 1014. The controller 1012 enables new members to register with the system at step 1702 through communications between the central personal mobility device charger controller and at least one of the plurality of charging applications. The controller 1012 enables new vendors to register with the system at step 1704 through communications between the central personal mobility device charger controller and the at least one of the plurality of charging applications. New member data is stored at step 1706 within the member profile database and new vendor data within the vendor profile database.

The local statistics database 1108 stores information relating to the neighborhood surrounding charging units 1014. This information may comprise information such as the availability of handicap parking near the particular vendor providing the charging unit or locations of personal mobility device accessible washrooms located nearby. Locations of nearby medical facilities that can provide treatment and services specific to the needs of a specific personal mobility device or personal medical device users will also be displayable through the mobile application 1016 in the event that the user is in need of medical or other intervention. Because of the user's dependence on the personal mobility device, the system could also provide the locations of nearby personal mobility device shops for parts and service and their hours of operation.

Registration controller 1106 is responsible for enabling new users to register with the central device charger controller 1012 after they have downloaded the mobile application 1016 to their personal mobile device. Trip planning controller 1110 enables a user to interact with the central device charger controller 1012 through their mobile application 1016 to plan a trip between locations and locate charging units 1014 located along the trip route or in close proximity to the trip route. Once various charging units 1014 are located that correspond to the trip plan, the reservation controller 1112 enables the user to make a reservation for a particular charging unit 1014 at a particular time through the mobile application 1016. An AIS 1113 may be utilized to provide more sophisticated trip planning that incorporates biometric measurement and monitoring to facilitate reservations and/or intervention for medical or other reasons. Marketing controller 1114 generates programs for marketing particular services to users by pushing information from the charger controller 1012 to the mobile applications 1016.

FIG. 12 illustrates a functional block diagram of the mobile application 1016 stored upon a personal mobile device. The application 1016 includes trip planning functionalities 1202 enabling a user to plan and locate charging units 1014 in conjunction with the device charger controller trip planning functionalities 1110. The trip planning functionality 1202 enables a user to search for charging unit enabled establishments/locations to make bookings and reservations for use of a specific charging unit 2014. The trip planning functionality 1202 utilizes charging unit 1014 availability around the specified area and may be carried out manually by user selections or automatically/semi-automatically with assistance from the trip planning controller 1110 within the device charger controller 1012. Utilizing user inputs of estimated times to be spent at each portion of a trip, the trip planning functionality 1202 in conjunction with the trip planning controller 1110 of the device charger controller 1012 provides advice on a sequence of charging stops and the optimum time and duration to be connected to a charging unit 1014. Upon user confirmation of a trip plan, the system will make the necessary reservations utilizing communications between the reservation interface 1206 of the application 1016 and the reservation controller 1112 of the device charger controller 1012 at the appropriate charging unit 1014.

The location controller 1204 enables the mobile application 1016 to determine a current position of the mobile device housing the mobile application. The location controller 1204 makes use of global positioning or other positioning functionalities to determine a terrestrial location of the personal mobility device, personal medical device or other electronic device for charging. This is useful in locating charging units 1014 that are in a current proximity to the user. The reservation interface 1206 enables the mobile application 1016 to generate a reservation for a particular charging unit at a particular time. The reservation interface 1206 interacts with the registration controller 1106 of the device charger controller 1012 in order to locate available charging units 1014.

Battery management controller 1208 makes calculations and determinations with respect to a user's current battery charge state for a personal mobility device or personal electronic device. The battery management controller 1208 determines when a last charge of the device occurred and based upon known discharge characteristics generates alerts and provides notifications to users when recharging of their personal mobility device or personal medical device is necessary in order to avoid the devices becoming completely discharged and stranding the user or placing them in a medical emergency situation. The battery management controller 1208 controls battery management and provides proper charging sequences, conditioning and protections. This is more fully illustrated in FIG. 19. A battery discharge rate of the personal mobility device is tracked at step 1902. Alerts to the user are generated at step 1904 responsive to a determination of a low battery condition of the personal mobility device. The battery management controller 1208 assesses battery to charger compatibility, provides charging management and provides real-time feedback and reporting on the charging process and level of the charging device's battery charge state so as to alert the user when the battery reaches specified user established threshold triggers or if the battery is impaired. This management and control by the battery management controller 1208 also ensures that the charging process is consistent with the various battery chemistry and technologies used in the respective batteries. Such control may also be moderated on demand to affect the charging rate for the battery such as to enable vendor discretion for pricing their services on the basis of fast or normal charging rates. The battery management controller 1208 may also provide automatic cutoff of the charging process when anomalies are encountered to prevent hazardous events.

The account controller 1210 stores user account information enabling a user to login to the device charger controller 1012 in order to obtain charging services. The account controller 1210 provides real-time account access by vendors and users as to their individual accounts to obtain charger usage and financial information and management. For example, the current status for a charging unit reservation and utilization may be obtained by the vendor. Users may obtain reservation status and carry out actions such as charging to a credit card and/or debiting a bank account with a predetermined booking fee in order to credit the amount to the system and reserve a predetermined portion of the transaction fee for the serving vendor. Payment controller 1212 stores payment information for the user enabling them to utilize the mobile application 1016 to automatically pay for and obtain charging services using for example credit card information, PayPal information, automatic bank draft information or other payment protocols.

The group control functionality 1214 provides for social media interactions and group socializing of system users. Group socializing such as the coordination of user activated group activities and/or assembly when the invited individuals are allocated to charging units 1014 for charging. Things such as group gifting capabilities may be facilitated to enable users to coordinate a group gifting campaign for a user, or anyone else that has a social media account, an email address and or mobile phone number. The group control functionality 1214 also provides the ability to offer other group apps by third parties such as Evite to enable group gatherings to be offered through the system 1010. Group controls 1214 could also provide neighborhood watch capabilities whereupon a user can automate the setting of alarm that is broadcast to one or more individuals whenever a trip plan is violated as to time of expected arrival and expected trip stop location as might occur when an elderly personal mobility device user gets forgetful and strays from their scheduled activities. Biometric measurement devices 1215 may also be used to provide indications for the need of medical or health related interventions. In such situations, the system could be programmed to send out a distress signal to either the police, and/or other preset emergency contacts. Distress signaling could be provided to alert care practitioners and/or emergency responders when a user's biometric condition triggers preset thresholds. The biometric devices 1215 may also me used for validating a user and enabling initiation of the charging process. The biometric devices 1215 may comprise devices such as fingerprint scanners, voice recognition devices, retinal scanners, etc. The group controls 1214 also provide aggregation or grouping of various personal mobility device accessible establishments and provide advertising services to such establishments to coincide with trip plans that a user may establish using the trip planning functionality 1202.

Figure 13:
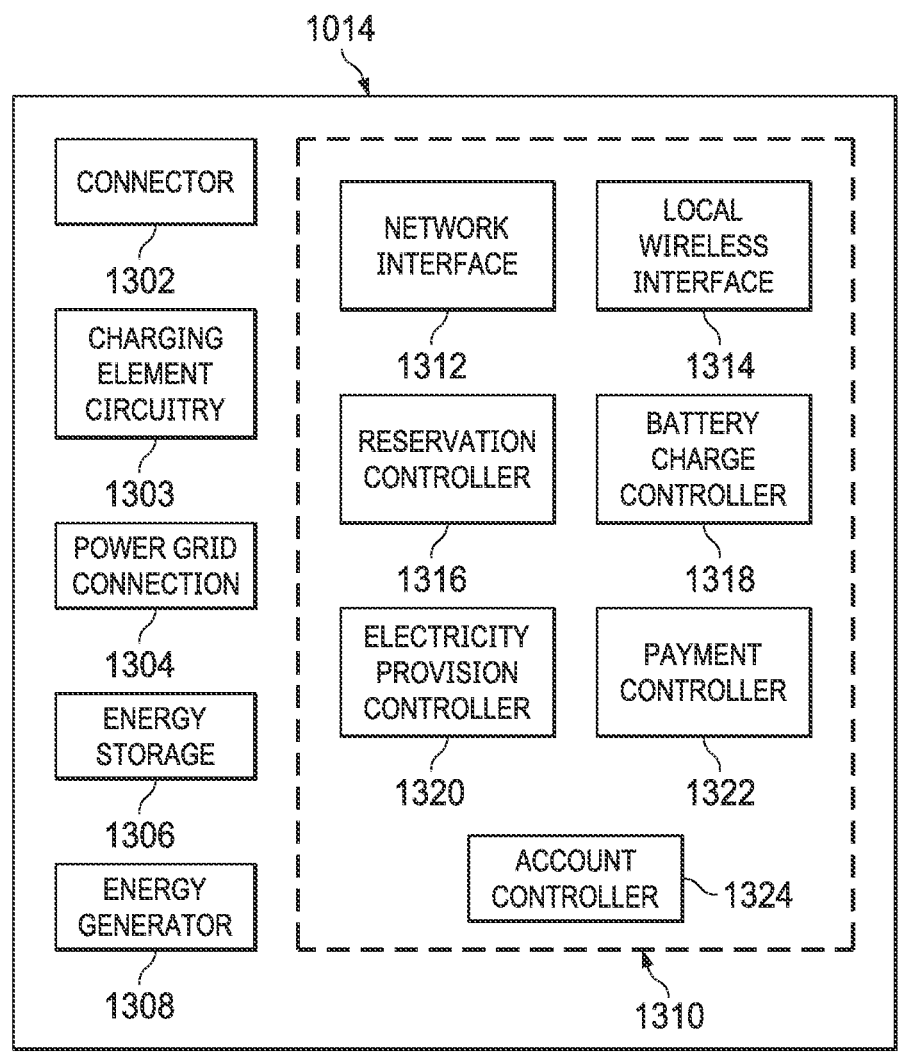
FIG. 13 is a block diagram of a charging unit of a medical/mobility device charging management system.

FIG. 13 provides a functional block diagram of the charging unit 1014. A connector 1302 enables the charging unit 1014 to connect with a device that is being charged. The connector 1302 provides charging current from the charging circuitry 1303. The charging circuitry 1303 generates the charging current from a provided energy source. The connector 1302 can be of one or a plurality of types to enable the charging unit 1014 to connect to a variety of different personal mobility devices, personal medical devices or other types of electrical devices needing charging. A connector 1302 may provide direct or inductive coupling or other state-of-the-art over the air technologies between the charging unit and the device being charge. The connector 1302 may comprise several connections under control of the central control module 1310. Each of the plurality of connectors may employ different connector configurations for connecting different personal mobility devices as different personal mobility devices may employ different connecting plugs and also contain different types of batteries (such as sealed lead acid (SLA) or lithium ion battery chemistry), different battery capabilities and different battery charging voltages and charging protocols.

The central control module 1310 provides a range of battery charging management and control protocols and functionalities for regulating the charging process as well as to monitor the personal mobility devices battery charge state to prevent overcharging which can lead to fire and explosions. Power grid connection 1304 connects the charging unit 1014 to the electrical power grid. The power grid connection 1304 provides a connection to the power grid that enables the charging unit to charge a connected electrical device using a generated charging current.

In addition to receiving electrical charging energy from the power grid, energy generator interface 1306 enables connection to an alternative energy generation source such as solar cells, a wind turbine, a gas powered generator, etc. Any type of non-electrical grid energy generation source may be utilized. Energy storage batteries 1308 may be used for storing energy for charging a connected electrical device without requiring an active electrical power connection. The off grid power provided by batteries and/or other energy storage devices can be regularly charged by solar panels or other renewable energy power generators such as wind turbines or even fossil fuel power generators. Offered power may in fact also be provided by user devices whereby one personal mobility device may be used to transfer power to another personal mobility device whether singly or in a ganged or combined fashion. The concept is not restricted to personal mobility devices but may also be applied to all portable or transportable user devices for inter-device charging. The batteries may be charged from a connected alternative energy source through the energy generator interface 1308 or through the power grid connection 1304.

A central management controller 1310 includes all of the central control functionalities for controlling the operation of the charging unit 1014 responsive to control information from the central device charger controller 1012 and mobile applications 1016. Communications with the central device charger controller 1012 and mobile applications 1016 are carried out through a network interface 1312 enabling communications over the network 1016. Further communications to the network 1016 or local devices may also be carried out through a local wireless interface 1314 using Wi-Fi, Bluetooth or other wireless communications protocols or through the powerline itself. The reservation controller 1316 enables information to be exchanged regarding the establishment of a reservation by a user and notification of the charging unit 1014 that the charging unit is no longer available at a particular point in time at which a reservation has been granted. The battery charging controller 1318 controls the battery charging process when an electrical device is actually connected with the charging unit 1014.

The electricity provision controller 1320 works in conjunction with the charging element circuitry 1303 to regulate the flow of electricity to the charging battery. The electricity provision controller 1320 has the ability to regulate the flow of electricity in such a manner as to manage the charging of users' device batteries that are connected to the charging unit 1014 so as to optimize the charging process or simply to regulate the speed of charging based on pricing and payment protocols. This process is facilitated by the data communications capability of the local wireless interface 1314 using Wi-Fi, 3G/4G/5G, Bluetooth etc. Payment controller 1322 provides point-of-sale functionalities enabling a user to pay for charging services received by their electric device. The payment controller 1322 may be in the form of a magnetic strip or smart chip reader that reads information from a credit card or a data entry terminal that receives information from a user's mobile application or enable manual entry relating to payment information that is used to charge a user's account. The account controller 1324 provides access to user account information based upon information received from the mobile application 1012 that has requested a charging time or is providing payment information.

In the case of the charging of large capacity battery powered personal mobility devices such as electric wheelchairs and scooters for the mobility impaired, such personal mobility devices typically take a long period of time to charge but are quick to discharge in use due to the unpredictable energy consumption modes. In such cases where the charging time required is long and there is a physical or medical dependence on the device by the user, the utility of being able to reserve a charging port becomes more of a necessity rather than a convenience. Consider the case of an electric wheelchair user, or the user of a portable oxygen concentrator (POC), a respiratory device for chronic obstructive pulmonary disease sufferers which requires the need of a charge while the user is out of their home. The user dependence on his wheelchair or POC precludes leaving the device to be charged while the user engages in an activity, unless the user has a spare device or is participating in an activity at the charging station itself such as a restaurant or theater.

Using the mobile application 1016 and device charger controller 1012, the user is able to reserve a charging port in advance for a predetermined time where the user knows they will be present at or near the charging facility. The user may also charge their device at the establishment when they are engaged in an activity at a location, such as dining at a restaurant, for a particular period of time. One of the features of the system is the assisting of the user in determining the optimum time for recharging which coincides with a period of immobility such as eating dinner at the restaurant that includes a charging unit and/or has the ability to facilitate charging services. The described system has tremendously broad utility and applicability to any and all rechargeable devices. While the disclosure is made with respect to rechargeable electric motor powered personal mobility devices for mobility impaired individuals or personal medical devices, the concept described herein is applicable to other types of electrically rechargeable devices that store energy and require recharging or energy refurbishment.

Figure 14:
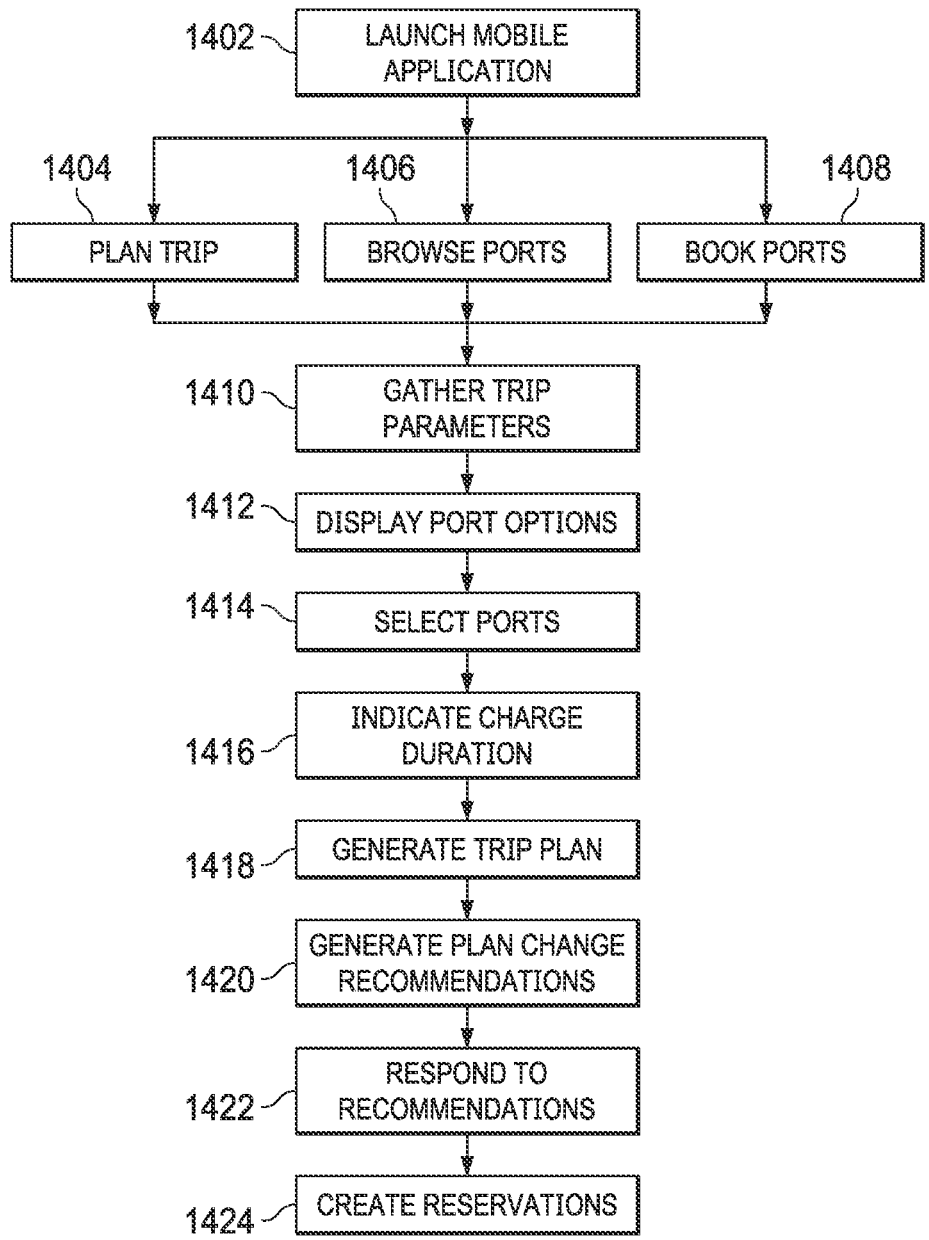
FIG. 14 is a flow diagram illustrating the process for generating a reservation in the medical/mobility device charging management system.

Referring now to FIG. 14, there is illustrated a flow diagram of the process for generating a reservation transaction. The system concept may be applied to a wide variety of rechargeable devices, and the utilization of the features of the system are very diverse. In the example of a personal mobility device user, one such feature of the system which is accessible via the mobile application 1016 is to plan a trip that encompasses various trip stops for charging the personal mobility device during the course of the journey and to coincide those charging periods with a specific stationary activity such as dining, drinking, reading or viewing a movie. During these times a personal mobility device is connected to a charging port and is being charged during the user's activity. A user launches at step 1402 the mobile applications 1016 on a smart phone or other communications devices such as electronic tablets and reviews several action options available for execution such as plan trip 1404, browse charging units 1406 or book charging units 1408. The user selects, in one example, browse charging units at step 1406 and asks for destination and area coverage at step 1410 to gather various trip parameters enabling them to make a charger selection. The coverage area may be viewed in miles, yards or even metric units. The user application 1016 displays at step 1412 the various locations that include charging units. The user browses the available destination points that they intend to visit during their trip to make sure that charging units 1014 are available during their trip.

Once satisfied with the availability of charging units 1014 at the specified trip stops, particular charging units 1014 are selected at step 1414 for the trip. The application 1016 asks for the expected time to be spent at each charging unit at step 1416 and upon user confirmation, a trip plan is generated at step 1418 that lists the recommended sequence of trip stops and the times allocated at each stop. The user can also generate trip plan change request/recommendations at step 1424 to charging units 1014 that have not been made a part of the generated trip plan. Based upon considerations of the stop times and expected lapse times and battery drain, the system will specify the trip plan at 1418 and provide recommended times for a charging appointment. The user can confirm the recommendation at step 1422, or alternatively, generate plan change recommendations at step 1420. If a user's changes are inconsistent with the user's personal mobility device characteristics and planned usage of the trip, the system will prompt the user for alternative selections and/or propose alternative charging unit bookings. Upon acceptance of the recommendations at step 1420, the reservations may be generated at step 1424.

Upon confirmation of a trip plan, the system will make the necessary charging unit 1014 reservations at step 1424 and interface with the appropriate charging units to perform the necessary booking protocols such that the charging unit 1014 is reserved for a particular user. Alternatively, using the trip planning functionalities 1202 of the application 1016, the user can simply plan a trip by selecting for example the planned trip function on the opening screen of his smart phone and the system will check the availability of charging units 1014 at various destination points and generate a trip plan with trip stop sequences automatically.

Figure 15:
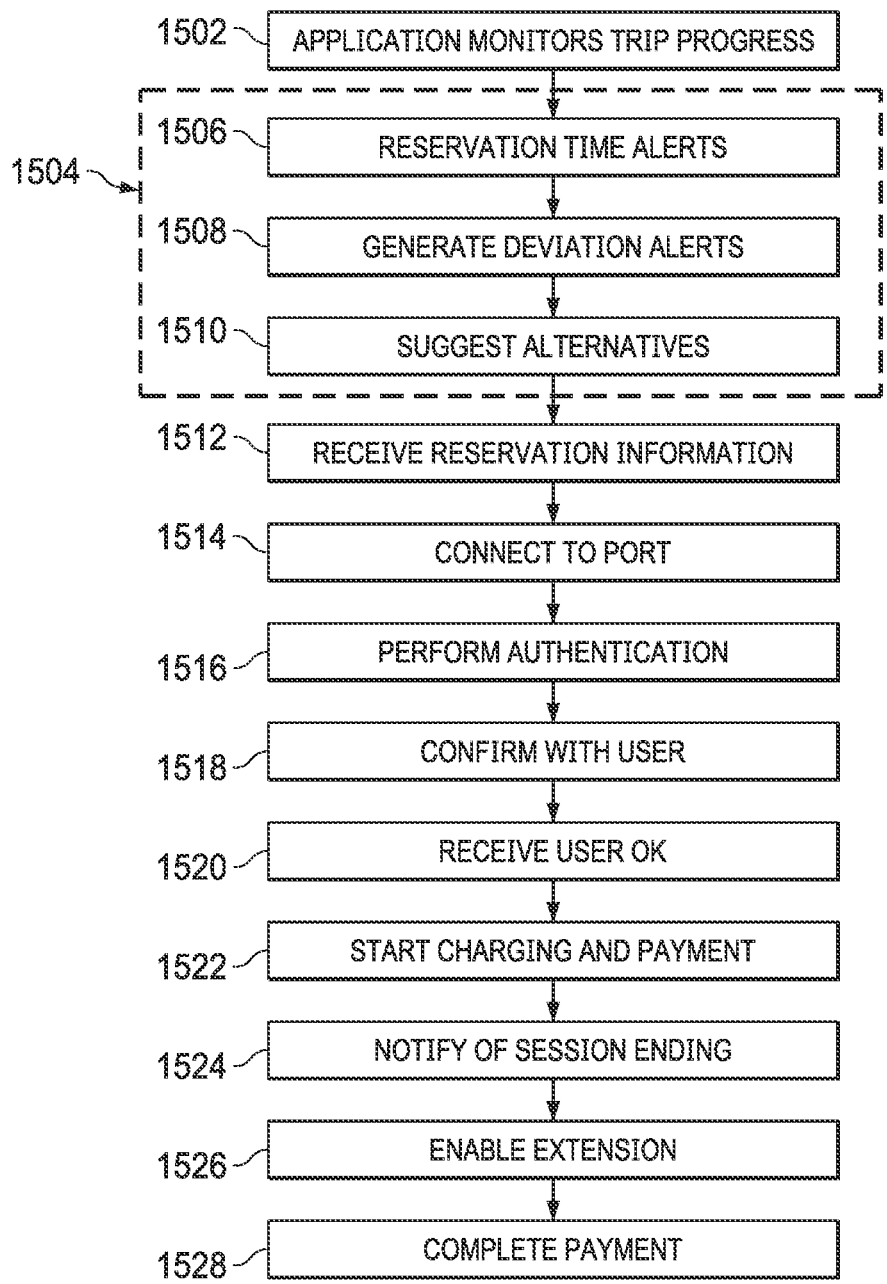
FIG. 15 illustrates an individual user using the medical/mobility device charging management system during a particular trip.

Referring now to FIG. 15, there is illustrated the process of using various reservations for device recharging during an actual trip. The user begins their journey and the mobile application 1016 will monitor the trip progress at step 1502. Based upon the trip progress monitoring, a number of different alerts or suggestions as shown generally at step 1504 may be generated to the user through their mobile application 1016. The user may be prompted along the way with reservation time alerts 1506 as scheduled charging unit 1014 reservation times approach. Alternatively, if the monitoring determines that the user has deviated from their trip plan schedule and appears to endanger their battery consumption plan, the system will generate a deviation alert at 1508 and prompt for a corrective action or propose a change in the trip sequence at step 1510 so as to enable one or more alternative charging unit 1014 bookings. However, such changes may result in booking cancellation penalties which are charged directly to the users credit card or bank account on file within the system. The user may also engage the AIS to entirely manage the charging sequences based on tracking the user's journey.

When a user stops at an appointed time at an appointed charging unit location, the user will present their reservation information at step 1512 to the charging unit vendor and is directed to a charging unit 1014 where the user can connect their personal mobility device, personal medical device or other electronic charging devices. Alternatively the charging unit 1014 may also provide indication of its location by optical means such as flashing colored lights which also indicates the charger's state of operation. The charging unit 1014 may also broadcast its location using beacon technologies that the mobile application 1016 may home in to or lock onto to provide direction guidance. Assuming that the vendor is a restaurant, the charging unit 1014 will likely comprise a reserved table. The personal mobility devices or electric wheelchair can simply wheel up to the table and charge while they are dining. Alternatively, if the personal mobility device and/or electric scooter cannot be used at a dining table, the vendor will likely have a designated parking area that is charging unit 1014 equipped, and the user is provided with a temporary wheelchair which can be used at the table. All such information concerning the vendor charging environment is available to the user through their mobile application 1016.

The user connects their device to the charging unit at step 1514. As soon as the device is plugged into the charging unit 1014, an authentication sequence will be initiated at step 1516. The progress of the authentication sequence is displayed on the users mobile application 1016 and may comprise verifying the personal mobility device identification (e.g. registered serial number), verifying the make model and power specification of the personal mobility device (which requires a user's affirmative action to ensure that the personal mobility device has not been modified from its original manufacturing state), the users credit card or bank account is validated and the time of the connection is recorded. The user authorizes commencement of the charging at step 1518 and this confirmation is received by the charging unit 1014 at step 1520. The system provides for different categories of users and does not require that the user have a smart phone and mobile application 1012. Each vendor having a charging unit is equipped or enabled to act as a proxy for authorization whereupon the visiting user may perform the authorization via the vendor's point-of-sale device. Such an option is a necessity in the case of a disabled user that cannot operate a smart phone, or tablet or does not have either one. Alternatively the system may use biometric validation methodologies.

The charging process and payment is initiated at step 1522. Once the scheduled charging unit session has ended, the user and vendor are alerted at step 1524. The user may be given an opportunity to extend the charging session at step 1526 provided that no other bookings for the charging unit 1014 have been scheduled. In the event that the specific charging unit 1014 has been pre-scheduled by another user, the system may offer the current user a different charging unit that is available. The system or vendor also has the ability to re-assign a different charging unit 1014 to the next scheduled user whereby the current user of a charging unit may extend his charging time or use of the vendor's facilities for perhaps an additional fee. Once the session is terminated, the system will complete the payment protocols at step 1528, and the user's preselected form of payment is charged and credited to the serving vendor. The system provides a variety of financial payment operations as commonly practiced in e-commerce such as scheduled billing and payment, record-keeping and periodic statement reporting, etc. It is up to the system operator and vendor to determine the frequency and method of payment from the system operator to the vendor.

Figure 16:
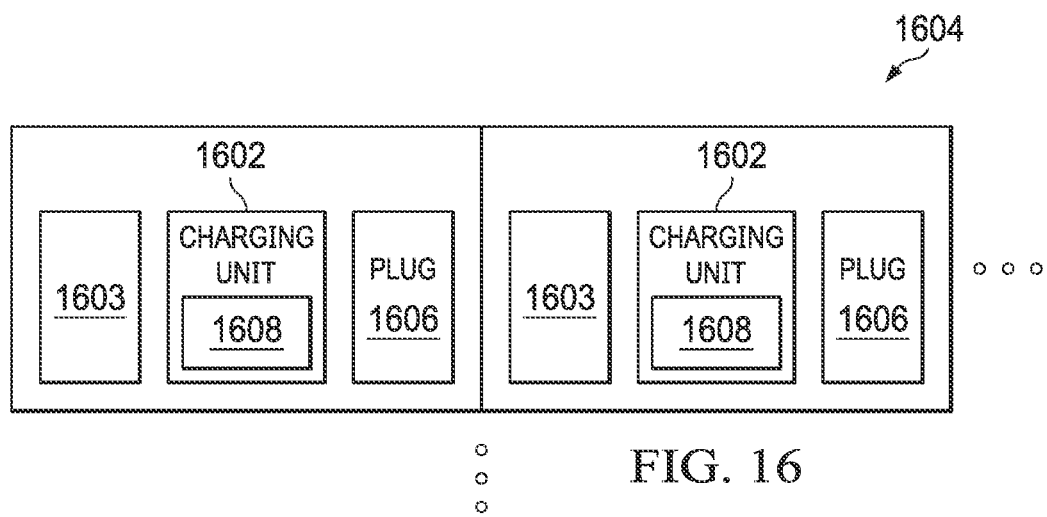
FIG. 16 illustrates a further configuration of the charging units.

Referring now to FIG. 16, there is illustrated a further configuration of the charging units, wherein a plurality of charging units 1602 are included within a group of one or more lockers 1604. Each locker 1604 includes a charging unit 1602 such as that discussed herein above and a plug 1606 for connecting any type of electric device that needs charging. By opening the locker using a key, providing a charging code received through a mobile application or by paying an indicated fee, a user is able to have access to the charging unit 1602 and plug 1606. The user can then connect their device for charging and lock the device 1603 in the locker while it is charging to maintain the device in a secure location while the user perform other activities. The communications interface 1608 associated with the charging unit 1602 can contact the user through the user's mobile application to broadcast a charging state (charging, quarter charge, half charge, three-quarter charge, complete charge, etc.) of a charging electric device. The lockers 1604 could additionally be used in a kiosk or other convenient grouping of the charging units.

The preceding discussion depicts one example of a charging management and reservation system wherein a personal mobility device, personal medical device or other electronic device is charged with a device specific cable that presumably delivers the appropriate DC voltage and amperage to the device while the charging unit 1014 performs the charge monitoring and management. Different devices may have different battery charging protocols, different connectors and characteristics and may either have an onboard charger which can be directly connected to the 120 V AC outlet or require an offboard (not part of the device) charger that provides the appropriate DC charge voltage and amperage and connectors. All these characteristics of specific devices are matched to the specific vendor's equipment repertoire.

The architecture of the management and reservation system 1010 is designed to be an "open" system which enables the incorporation of third-party apps and system components such as third-party cloud platforms, group meeting and group gifting apps. Additionally, the system functionality is an open system that can provide the same reservation and charging functionality for other rechargeable devices such as E-Bikes, two wheeled balance scooters or Segway devices, smart phones and tablets and portable respiratory devices dependent on the particular vendor. A vendor could simply be an individual that owns a charger for a specific rechargeable device that may be obsolete or hard to come by and in such situations the individual vendor may find an opportunity to rent out their charger rather than generating a one-time sale. The user could also be traveling and have forgotten to carry their charging equipment for their device in which case the ability to rent such a charger via the system would be a lifesaver.

The system also incorporates the capability to register vendors on the spot via the mobile application 1016 as in the case when a user finds a willing establishment that is not yet part of the system but which is willing to allow the user to utilize the establishment's 110-120, 220-240 V AC outlet or other power source. In providing this vendor registration capability via the mobile application 1012, the system is able to propagate utility organically via its membership database.

In an alternative embodiment, the tracking and control of individual power outlets may be tracked and identified for users of personal mobility devices or portable electronic devices in order to enable them to locate and connect to the power outlets for the purpose of charging their devices. The proliferation of portable and transportable electrical and electronic devices that run on battery power or other mobile power sources are ever-increasing. When a user of a portable electronic device needs power there is no easy way to search online for an available compatible power source.

Figure 20:
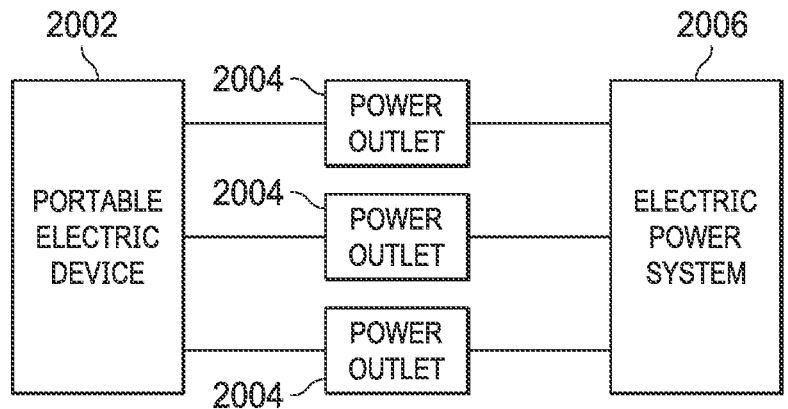
FIG. 20 illustrates an operating environment of a power outlet management system.

The described system and method for registering and controlling electrical power outlets comprises a system for the instant cataloging of the location, characteristics and functionality of power outlets by a user and for the verification of the existence and characteristics of the identified power outlet. Referring now to FIG. 20, there is generally illustrated the operating environment of the described system. For example, a portable electronic device 2002 may plug into one of a selected number of power outlets 2004 to provide for the charging of the portable electronic device. The power outlets 2004 are provided with electrical power from the electrical power system 2006. The system for providing for power outlet registration and control encompasses various technologies such as the Internet, cloud computing environment, wireless, remote, in-line, near field and transponder communications, power transmission protocols, delivery and measurement, database techniques and technologies, the electricity grid, alternate power conveyance grids, and Internet of things protocols as well as methods to enable and provide for a range of services to a portable electronic device user for which they must subscribe the online registration with the system.

As illustrated in FIG. 20, there are already many passive electrical power outlets installed worldwide that provide power to a device by connecting that device to the electrical source or power grid through the power outlet. The power outlets are owned by individuals, businesses, organizations, government bodies and others as power providers and the cost of providing power is borne by these power providers. Usually the outlets are available for access by anyone and are not restricted by the provider. The problem is that the locations of the power outlets are not usually evident, discoverable or retrievable and may not be catalogued online. Thus, the power outlet registration, control, and management system herein includes a networked database and mechanism for registering, recording the location and characteristics of electric outlets. Information may include the type of outlet and type of power provided by the outlet such as USB (universal serial bus), AC (alternating current), power capacity, etc.

In order to accelerate the cataloging of power outlets, the power outlet registration and control system utilizes the recruitment of the general population of users who may register with the system the locations and characteristics of power outlets that the person has discovered. Recruitment or incentivization of users to engage in such registration may be handled in many ways and fashions such as by providing free memberships to a reporting user to access the system and use its features and functions. Other means and marketing techniques which are generally known and widely used commercially may also be utilized.

Figure 21:
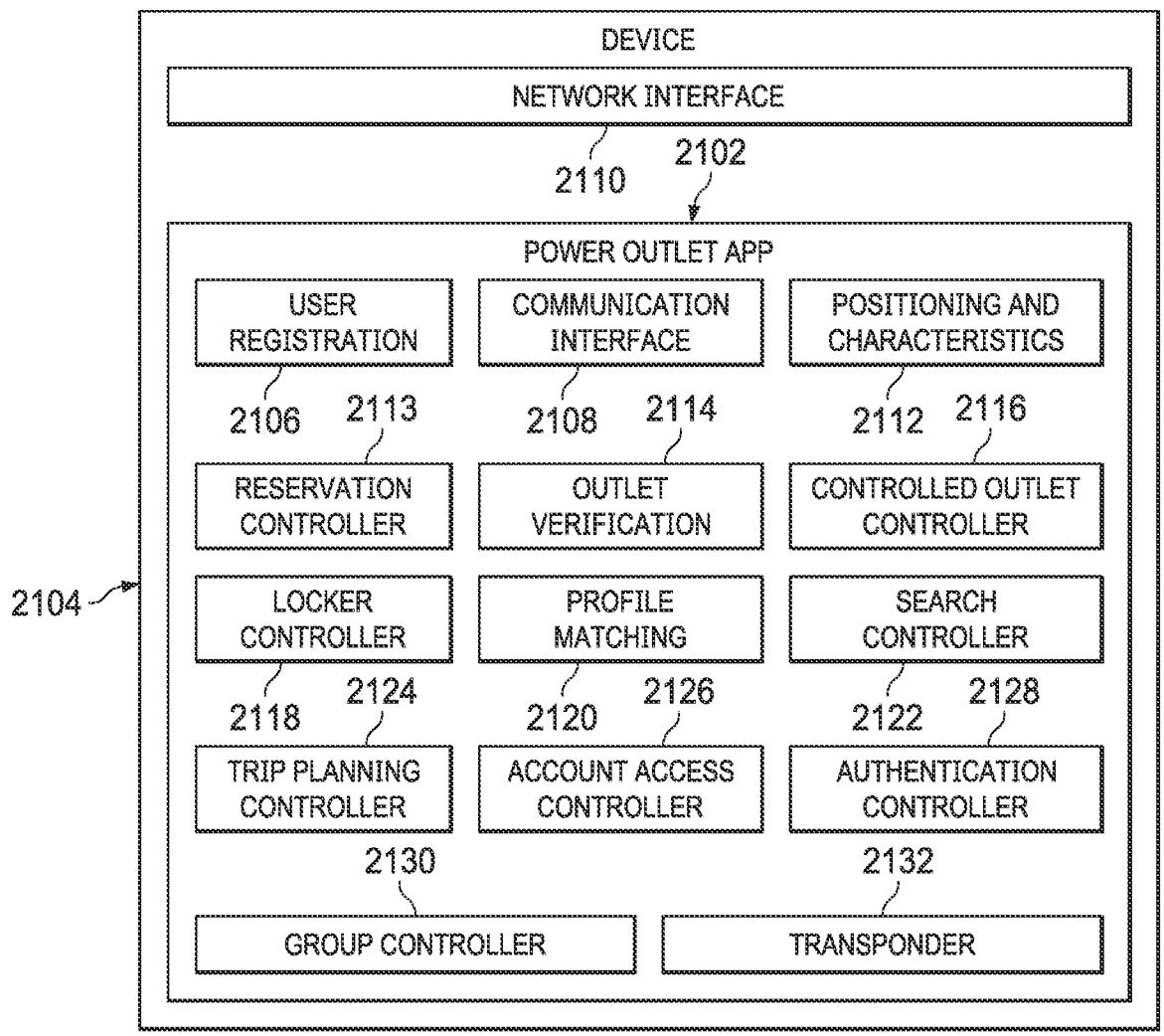
FIG. 21 illustrates a functional block diagram of a power outlet application for installation on a mobile device.

Referring now to FIG. 21, reporting of the location of power outlets can be facilitated using a software application (app) 2102 installed on a device 2104. The device may be a mobile phone, mobile tablet, electronic book, laptop etc. The power outlet app 2102 includes a user registration controller 2106 to provide for the registration of the reporting person as a member of the system as well as recording the location and characteristics of the power outlet 2004. Communications between the app 2102 to a central controller are carried out through a communications interface 2108 of the power outlet app 2102 working in conjunction with the network interface 2110 of the device 2104. Additionally, the app 2102 provides instructions and mechanisms for verifying the location of the power outlet 2004.

Figure 22:
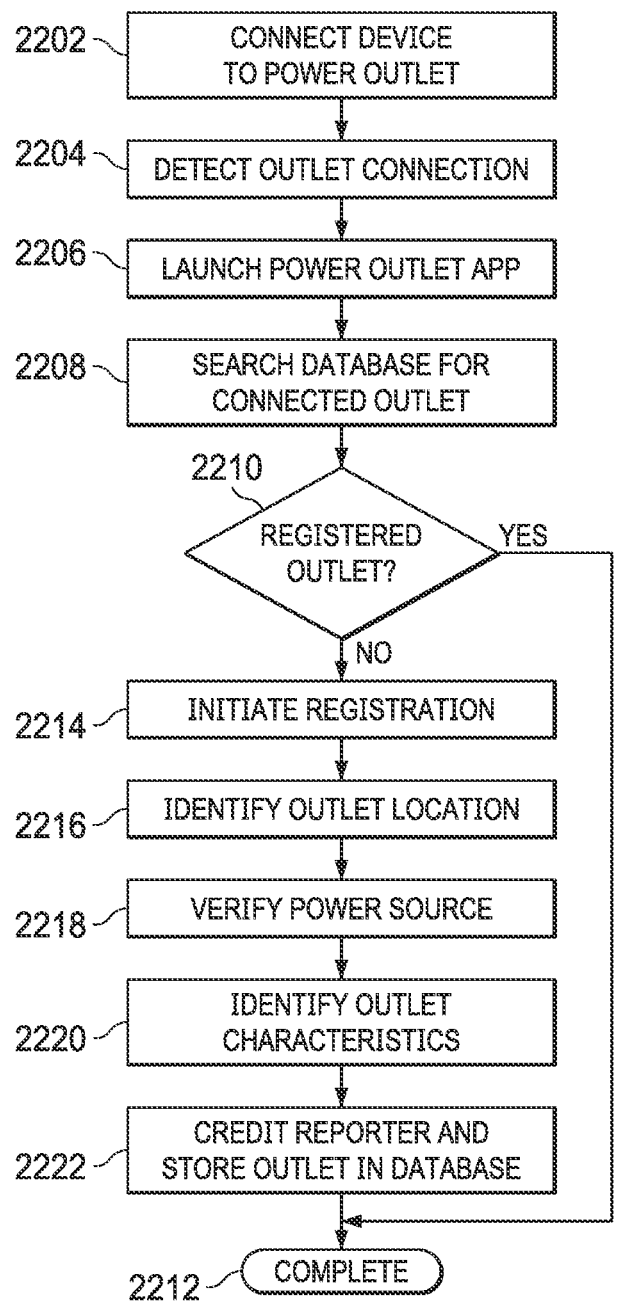
FIG. 22 illustrates a flow diagram of a verification protocol for registering a power outlet.

Referring now to FIG. 22, there is illustrated one example of a verification protocol. The process is initiated when a user connects their device at step 2202 into a power outlet. The power outlet app 2102 detects connection to the power outlet at step 2204. Responsive to the detection of the connection, the app 2102 automatically launches at step 2206. The launched application searches an associated database for a record of the outlet previously stored within the database at step 2208. Inquiry step 2210 determines if the outlet has been previously registered. If so, the process is completed at step 2212. If the outlet has not been previously registered, the registration process is initiated at step 2214. As part of the registration process, the location of the power outlet is identified at step 2216. The connection of the power outlet to a power source is confirmed at step 2218, and various characteristics associated with the outlet are identified at step 2220. After all of this information is provided by the registrant or automatically by the app 2102, the individual reporting the power outlet is credited with the report and the information related to the power outlet is stored within the database at step 2222. The process is complete at step 2212.

Referring now back to FIG. 21, positioning and characteristic controller 2112 may utilize one of several different methodologies for identifying a new power outlet. These techniques involve using other applications such as Google maps or other mapping applications to convey the coordinates of the reporter's mobile phone to the power outlets manager system. Smart grid technologies may also be used for determining a power outlet's location if the outlet's location is being monitored by some third-party grid operators control and management system, or if the outlet is a new generation smart outlet that incorporates location identification and is capable of transmitting such information. In this situation, the positioning and characteristics controller 2112 would contact the management system associated with the power outlet or if it is a smart outlet to interrogate the smart outlet pursuant to standard communications protocols which are enacted in order to determine the outlet's position. The positioning and characteristics controller 2112 may also be used for inputting and/or recording characteristic information of the power outlet such as whether it is a USB connector, alternating current connector, single or multiple sockets, etc. The positioning and characteristics controller 2112 provides a reporter the ability to describe a located power outlet and may enable engagement of the camera of the mobile device to take photos of the location of the outlet and surroundings and to enable recordation of other characteristics of the outlet such as the type of power socket, the number of sockets and other characteristics. In addition, robot programs ("bots") may be used to probe the various energy grids automatically to identify and register points of power distribution and dispensation which may embody outlets that are accessible.

To further ensure that the new outlet port actually exists, the power outlet app 2102 uses the outlet verification controller 2114 to verify that power is derivable from the located new power outlet that is being reported. Other verification methods may be employed such as searching a database of municipalities relating to building permits and architectural plans of a located outlet's host building or structure in order to verify the existence of the outlet. Upon verification of the existence and location of a power outlet, the reporter is credited with the discovery and a recording of the outlet is effected within the power outlet manager database. In the event that the existence and location of the new power outlet cannot be immediately verified and recorded, the power outlet application 2102 will flag the registration attempt as an incomplete registration and hold the record indefinitely in the event that there was an unplanned power shutdown at the time the registration was attempted or for whatever reason that the registration could not be completed at that time. For example, the reporter may not have time to complete the registration process and unplugs their mobile device, or the host structure experiences a power utility outage, etc.

A reservation controller 2113 enables a user that is registered with the system to make a reservation at system controlled power outlets through the power outlet application 2104. A user may reserve a particular outlet at a particular time and for length of time in order to charge their device.

The power outlet manager system will publish and make available the power outlet application 2102 through various online stores that list and sell mobile software applications such as Apple's® App Store or Google's online store Google® Play so that anyone can download the power outlet application 2102 in order to be able to access the system and locate and use any outlet defined within the database. The user may be required to pay a membership fee for the privilege of using the system to locate power outlets, and may also be required to pay a fee for reserving outlets and to use the located outlet to derive power when the power outlet is a controlled power outlet as more fully described herein below.

Figure 25:
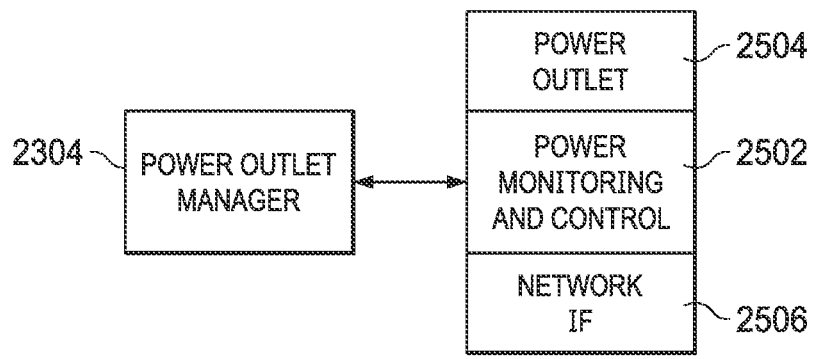
FIG. 25 illustrates an interaction between a controlled power outlet and the power outlet manager system.

A controlled outlet controller 2116 transmits and receives control instructions for controlling the operation of a controlled outlet 2504 as in FIG. 25. A locker controller 2118 enables a user to access a locker 2312 in FIG. 23 that may be associated with a controlled outlet 2504 in a similar manner to the lockers discussed herein above. A profile matching controller 2120 enables a user to search for power outlets having a profile that match the profile of the device they desire to charge. Thus, for example, if a user was trying to charge a device having a particular type of cable or connector required, the profile matching controller 2120 would compare the device characteristics with a list of nearby outlets that meet the requirements associated with the user's device profile. The search controller 2122 enables a user to enter particular search parameters associated with a power outlet and search for registered power outlets meeting these search parameters. Searching functionalities 2604 in FIG. 26 enables a user to search for power outlets anywhere using various search criteria such as proximity to the user or other landmarks/areas, type of outlet, availability (for reservable outlet), etc. A trip planning controller 2124 enables a user to enter starting and ending locations associated with a particular trip. As more fully described herein below, the controller 2124 interacts with the power outlet manager system 2304 in order to provide the ability to locate outlets located at stops along a trip path, make changes to the trip path and provide warnings upon deviations from the trip path that may cause the electronic device to run out of charge. Account access controller 2126 enables the user to access their user account with the power outlet manager system 2304 and establish information therein such as passwords, contact information, payment information, profile establishment and anything else associated with accessing and changing the information associated with their account. Account access functionalities provide for real-time access by users and outlet providers as to their individual accounts in order to obtain usage of financial information and management of user data. Information such as the current status of an outlet provider's outlets, reservation and utilization history or reservation status/history of the user, etc. The authentication controller 2128 controls the manner in which a user accesses their account. The authentication controller 2128 authenticates the user based upon a username, password, email information, token or any other identification means that may be utilized for confirming that a user attempting to access the system is an authorized user. Authentication functionalities enable authentication of the user for connection to an outlet, controlled outlet or locker. The authentication functionalities further provide for necessary electronic banking actions such as charging a credit card and/or debiting a user's bank account with a predetermined booking fee. Additional functionalities may assist with crediting an amount to the appropriate parties including the power outlet manager system 2304, an outlet provider, a premises owner/operator and/or others. The group controller 2130 controls the manner in which a user may be contacted via the app 2102 in registered or defined groups such as social media groups. Individuals having a common interest or need may be contacted and provided information relevant to that particular group. A transponder or transponder controller 2132 provide remote control capabilities within the controlled outlets or locker such that predetermined device types can sync up with the system ports and trigger certain applications such as announcing compatibility of power conductivity, voltage, socket type etc.

Figure 23:
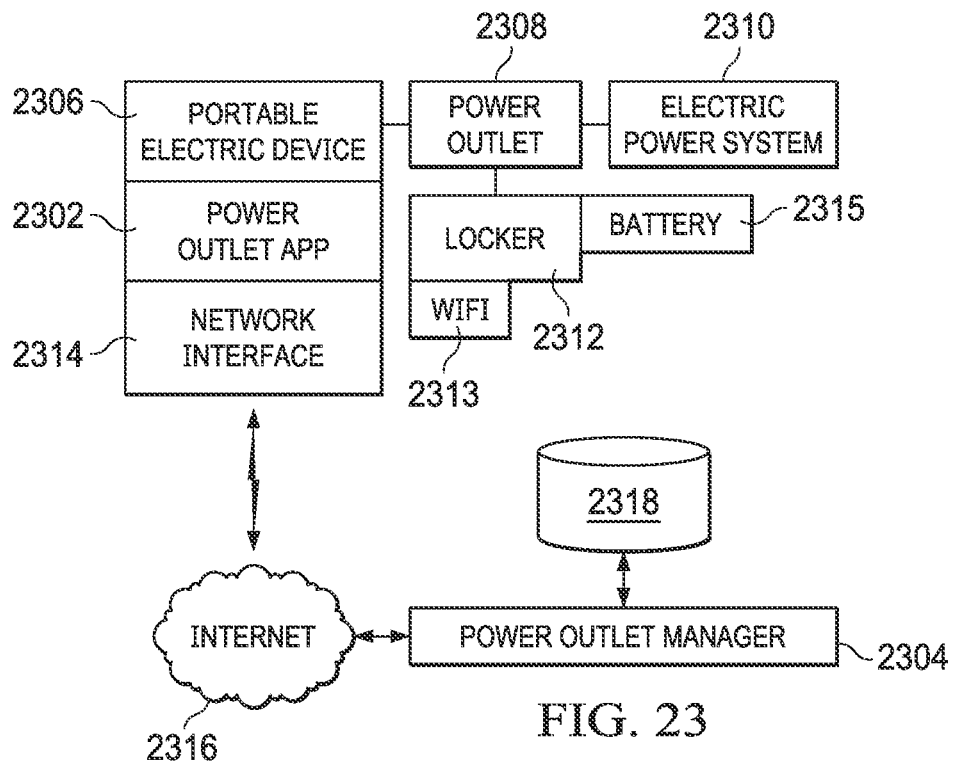
FIG. 23 illustrates a diagram of a system for providing registration of and access to a power outlet using a power outlet management system.

Referring now to FIG. 23, there is more fully illustrated the interaction of the power outlet app 2302 with the power outlet manager system 2304. The power outlet app 2302 is implemented within a portable electric device 2306 such as a mobile phone, tablet, pad, computer etc. The portable electric device 2306 can connect with a power outlet 2308 in order to charge the portable electric device 2306 using an electric power system 2310. The power outlet 2308 can further have a locker 2312 associated therewith and into which the portable electric device 2306 may be placed when charging through the power outlet 2308. The electronically keyed locker 2312 has a built-in electronically controlled locking mechanism that is operated remotely in order to physically secure a user's mobile device within the locker box whether it is connected to power or not. The locker 2312 may also be reservable and incorporate data communications capability to interact with the power outlet and incorporate built-in power cables and power voltages such as those specific to certain popular phone manufacturers such as Apple, Samsung, etc. The locker may also be equipped with automated vending equipment that offers items for sale or rent such as candies and charging cords. If space is sufficient the locker may even be equipped with printers, fax machines, and other devices for onsite use. Wi-Fi 2313 may be provided from each controlled outlet or locker that is also equipped with Wi-Fi and data communications capabilities and also provide this functionality as a Wi-Fi router with secured access that is administered through the power outlet management system 2304 as an alternative premium service offering to users. Each controlled outlet or locker may also be equipped with built-in rechargeable batteries 2315 to provide backup enabling the outlet to function as emergency lighting using multiple colors while maintaining communications with the power outlet management system 2304.

The power outlet application 2302 communicates with the power outlet manager 2304 through a network interface 2314 associated with the portable electric device 2306. The network interface 2314 provides a communications link over the Internet 2316 with the power outlet manager 2304. The power outlet manager 2304 stores all the information associated with various power outlets 2308 in an associated power outlet manager database 2318. The power outlet manager 2304 embodies an Internet cloud environment/mechanism or other wide area network mechanism for or communications between the database 2318 and power outlet manager controller 2304 and for maintaining an ongoing real-time registry within the database 2318 of all outlets on the system and/or any other third party database as may be available or necessary.

Figure 24:
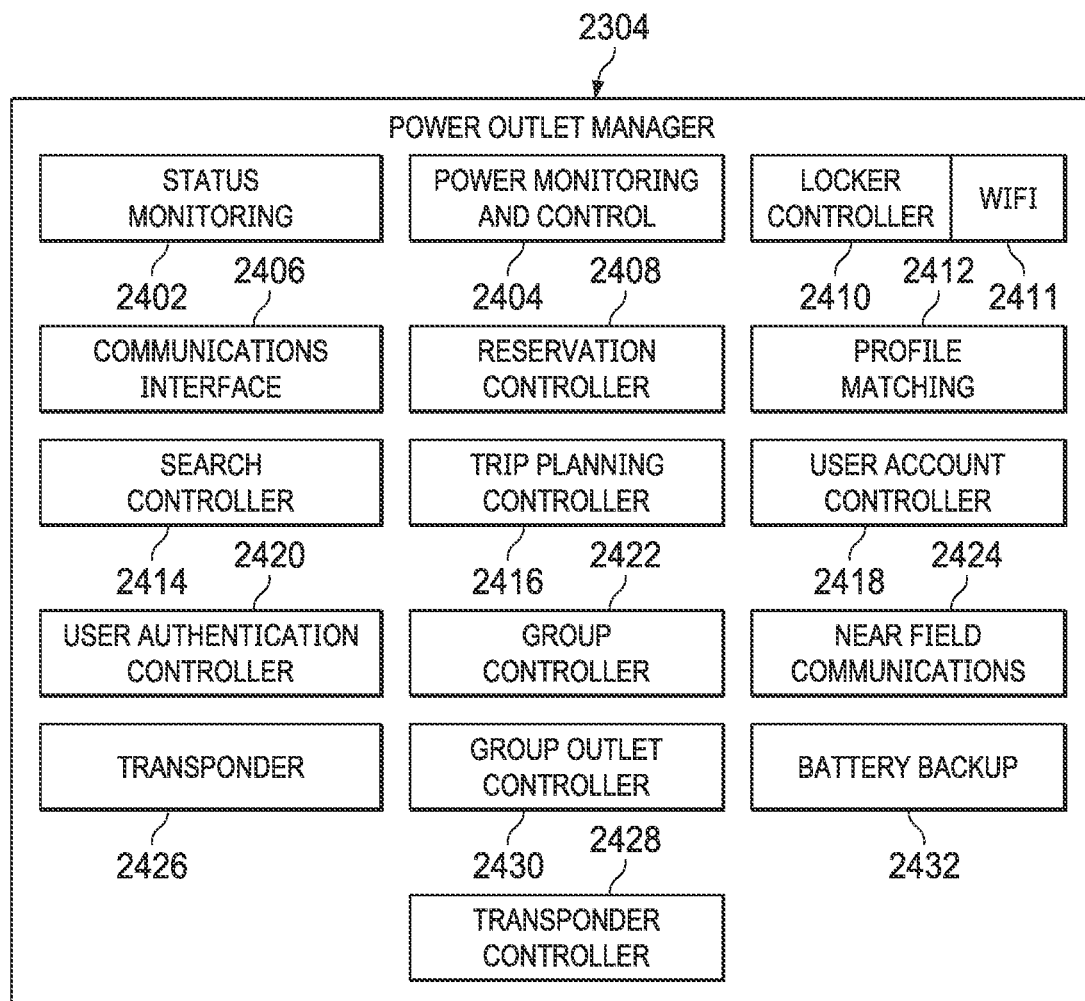
FIG. 24 is a block diagram of the power outlet manager system.

Referring now to FIG. 24, there is illustrated a block diagram of the power outlet manager system 2304. The power outlet manager system 2304 includes a status monitoring controller 2402 for tracking the status of all the power outlets as to whether the outlet is connected to a power source/grid, whether it is in use, the duration of each connection, and whether it is in an end-user idle state. If the power outlet has been equipped with a power monitoring and control circuitry 2502 as illustrated in FIG. 25, the power outlet manager system 2304 communicates with power monitoring and control circuitry 2502 that is connected to a power outlet 2504. The power monitoring and control circuitry 2502 communicates with the power outlet manager 2304 over an associated network interface 2506. The power monitoring and control controller 2404 of the power outlet manager 2304 enables maintenance of characteristics within the controlled outlets data record with respect to the power outlet manager system 2304. The registration and administration of a controlled power outlet 2504 occurs in a similar fashion to a passive outlet that is not controllable.

A locker controller 2410 controls access to and reservation of lockers that are associated with controlled power outlets. If the power outlet is a controlled outlet with built-in communications capability using wireless connectivity such as Wi-Fi or other data transmission mechanisms, the communications capability is provided through a communications interface 2406 to provide the Wi-Fi or other communication mechanisms. Wi-Fi controller 2411 controls the WiFi provided from each controlled outlet or locker that is also equipped with Wi-Fi and data communications capabilities and also provide this functionality as a Wi-Fi router with secure access that is administered through the power outlet management system 2304 as an alternative premium service offering to users. Controlled outlets 2504 may be subject to advanced reservations using a reservation controller 2408 within the power outlet manager 2304. The reservations are maintained within the database 2318 associated with the power outlet manager 2304. If a user has not registered with the system as a subscriber but is equipped with appropriate wireless data communications technologies such as Bluetooth, 3G/4G/5G, etc. such user may be allowed access by the locker controller 2410 as a one-time user for limited use, and/or prompted to register as a member and subscribe for service on the spot.

The power outlet manager 2304 further includes profile matching 2412 for interacting with the profile matching controller 2120 of the app 2104. The profile matching controller 2412 enables the power outlet manager system 2304 to search for profiles of registered outlets that match the required profiles of the user or their device. The search controller 2414 responds to the request from the power outlet app 2102 to search for registered power outlets located near the app user. Search may be based on any number of parameters including geographic position, required cable or connector type or availability of an outlet for charger reservation. Searching functionalities enable a user to search for outlets using various search criteria such as proximity to the user or other landmarks/areas, type of outlet, availability (for reservable outlet), etc. The trip planning controller 2416 enables the determination of a trip plan responsive to request from the power outlet app 2102 and information contained within the system database 2318. Trip planning functionalities enable a user to plan a trip based on outlet availability within a specified area to be visited, either manually, automatically or semi-automatically with assistance from the power outlet manager system 2304. The user may input an estimated time to be spent at a number of locations of the trip. The power outlet manager system 2304 will advise on the sequencing of the stops and the optimum time and duration to be connected to an outlet, controlled outlet or locker at the stop. Upon user confirmation of a trip plan, if there are controlled outlets that are available within an established itinerary, the power management control system 2304 will make the necessary reservations for the respective controlled outlets and/or lockers while providing a list of non-reservable outlets that may also be accessed. User Account Controller 2418 updates account information with respect to a particular registered user responsive to information received from the power outlet app 2102 within the system database 2318. Account access functionalities provide for real-time access by users and outlet providers as to their individual accounts in order to obtain usage and financial information and management. Information such as the current status of an outlet provider's outlets, reservation and utilization history or reservation status/history of the user, etc. User authentication controller 2420 is responsible for allowing the system 2304 to verify the identity of a user attempting access based upon their user credentials stored within the database 2318 and an entered username, password, token, etc. provided from the power outlet app 2102. Authentication functionalities enable authentication of the user for connection to an outlet, controlled outlet or locker. The authentication functionalities 2612 further provide for necessary electronic banking actions such as charging a credit card and/or debiting a user's bank account with a predetermined booking fee. Additional functionalities may assist with crediting an amount to the appropriate parties including the power outlet manager system 2304, and outlet provider, a premises owner/operator and/or others.

The group controller 2422 enables the grouping and communication of multiple users with each other by the system 2304. Group activities functionalities enable group socializing utilizing the application 2302. Group socializing may comprise the coordination of a user activated group activity or assembly wherein the invited individuals are allocated power outlets or lockers for use. The group activities functionalities may also include a group gifting capability to enable users to coordinate a group gifting campaign for a user either within or outside of the power outlet manager system 2304. The gifting capability may be provided to anyone that has a social media account such as Facebook, an email address and/or mobile phone account. The group activities functionalities may also provide the ability to offer other group apps provided by third parties such as eVite for group gatherings to be offered through the power outlet manager system 2304.

Near field communication circuitry 2424 provide for near field communication responsive to electronic devices coming near registered power outlets. Each controlled outlet or locker may also be equipped with near field communication functionalities whereby the outlet or locker can detect the approach or proximity of mobile phones or other mobile communication devices and engage in communications therewith. The communications may provide advertising, promotions, etc. or provide for the detection of incoming devices using technologies common in cellular communications for triangulation of the location of the user device. Transponder controller 2428 controls operation of the transponders 2426. A transponder functionality may provide remote control capabilities within the controlled outlets such that predetermined device types can sync up with the system ports and trigger certain applications such as announcing compatibility of power conductivity, voltage, socket type, etc. A group outlet controller 2430 may group various controlled power outlets together and operate them in a similar manner to provide for example advertising information from each of the associated outlets. Group control functionalities enable groups of controlled outlets or lockers to be controlled together for synchronized functionalities such as broadcasting promotions available in the vicinity. Battery backup 2432 provides for control of backup batteries associated with the system 2304.

The power outlet manager system 2304 enables any provider of power outlets, controlled outlets, and/or lockers to register with the system whether the outlet or locker is installed in a home, office or other premises. The power outlet manager system 2304 will list and offer the outlets, controlled outlets and lockers to other users of the system through their apps. A power profile matching controller 2412 enables matching between users and power outlets seeking compatible power and compatible features such as specific cable types and/or voltages. Controlled outlets may be designed to provide a variety of power voltages, currents, frequencies, socket types, etc.

Figure 26:
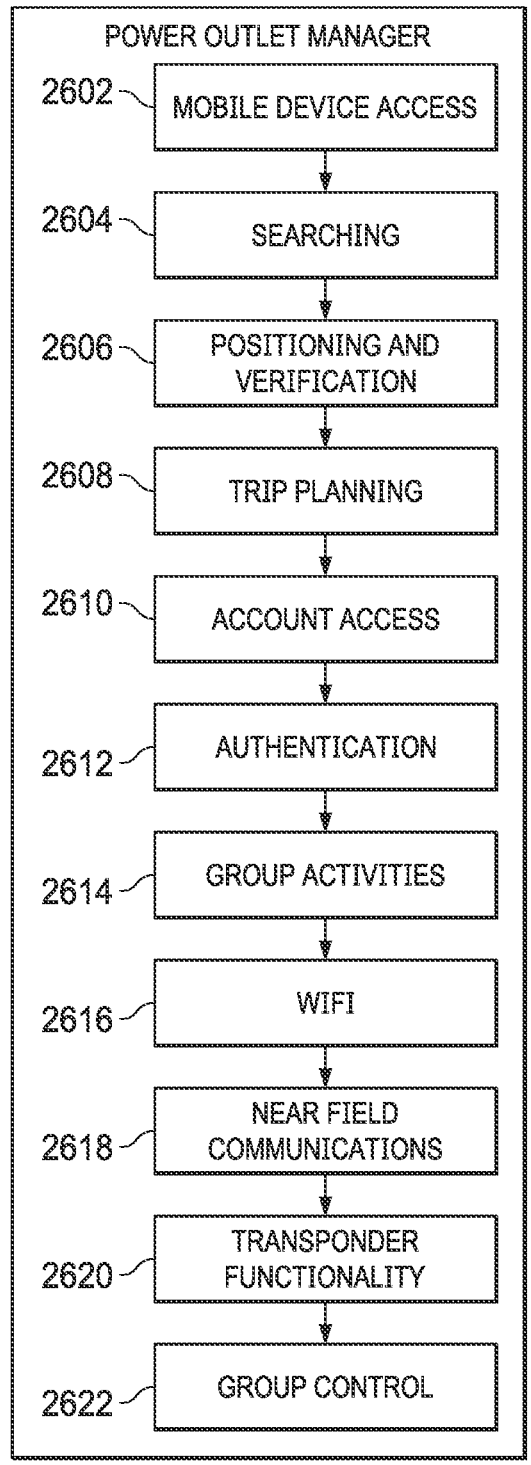
FIG. 26 illustrates a summary of the functionalities provided by the power outlet management system.

Referring now to FIG. 26, there are illustrated various functionalities that may be provided by the power outlet manager system 2304 as discussed herein above. Accessibility 2602 via the power outlet application 2302 is provided by the power outlet manager system by installation of the application on a user's smart phone, electronic tablet, laptop computer or other device having data communications capability and the appropriate browsers. Searching functionalities 2604 enable a user to search for outlets using various search criteria such as proximity to the user or other landmarks/areas, type of outlet, availability (for reservable outlet), etc. Positioning and verification functionalities 2606 enable the use of Global positioning and/or locating of a terrestrial location of an outlet, controlled outlet and/or locker for registration and the existence and status verification of the presence of the outlet in the power outlet manager system database 2318.

Trip planning functionalities 2608 enable a user to plan a trip based on outlet availability within a specified area to be visited, either manually, automatically or semi-automatically with assistance from the power outlet manager system 2304. The user may input an estimated time to be spent at a number of locations of the trip. The power outlet manager system 2304 will advise on the sequencing of the stops and the optimum time and duration to be connected to an outlet, controlled outlet or locker at the stop. Upon user confirmation of a trip plan, if controlled outlets are available within an established itinerary, the power management control system 2304 will make the necessary reservations for the respective controlled outlets and/or lockers while providing a list of non-reserveable outlets that may also be accessed.

Account access functionalities 2610 provide for real-time access by users and outlet providers as to their individual accounts in order to obtain usage and financial information and management. Information such as the current status of an outlet provider's outlets, reservation and utilization history or reservation status/history of the user, etc.

Authentication functionalities 2612 enable authentication of the user for connection to an outlet, controlled outlet or locker. The authentication functionalities 2612 further provide for necessary electronic banking actions such as charging a credit card and/or debiting a user's bank account with a predetermined booking fee. Additional functionalities may assist with crediting an amount to the appropriate parties including the power outlet manager system 2304, and outlet provider, a premises owner/operator and/or others.

Group activities functionalities 2614 enable group socializing utilizing the application 2302. Group socializing may comprise the coordination of a user activated group activity or assembly wherein the invited individuals are allocated power outlets or lockers for use. The group activities functionalities 2614 may also include a group gifting capability to enable users to coordinate a group gifting campaign for a user either within or outside of the power outlet manager system 2304. The gifting capability may be provided to anyone that has a social media account, an email address and/or mobile phone account. The group activities functionalities 2614 may also provide the ability to offer other group apps provided by third parties such as eVite for group gatherings to be offered through the power outlet manager system 2304.

Wi-Fi functionalities 2616 may be provided from each controlled outlet or locker that is also equipped with Wi-Fi and data communications capabilities and also provide this functionality as a Wi-Fi router with secure access that is administered through the power outlet management system 2304 as an alternative premium service offering to users. Each controlled outlet or locker may also be equipped with near field communication functionalities 2618 whereby the outlet or locker can detect the approach or proximity of mobile phones or other mobile communication devices and engage in communications therewith. The communications may provide advertising, promotions, etc. or provide for the detection of incoming devices using technologies common in cellular communications for triangulation of the location of the user device.

A transponder functionality 2620 may provide remote control capabilities within the controlled outlets for a locker such that predetermined device types can sync up with the system ports and trigger certain applications such as announcing compatibility of power conductivity, voltage, socket type etc. Group control functionalities 2622 enable groups of controlled outlets or lockers to be controlled together for synchronized functionalities such as broadcasting promotions available in the vicinity. Many other application features are possible as may be marketable by virtue of the communications and control capability built-in to the controlled outlet and locker.

Figure 27:
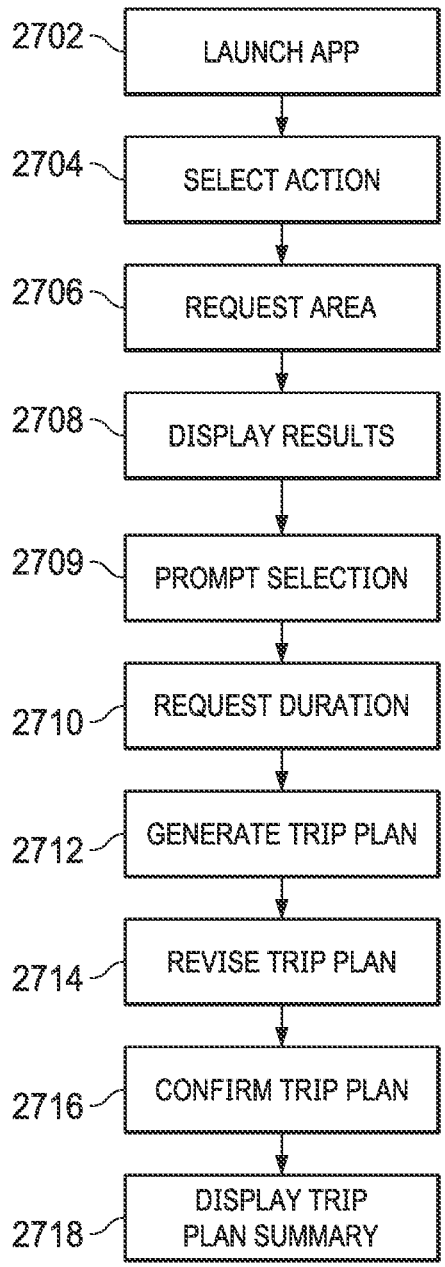
FIG. 27 illustrates a flow diagram of a process for generating a trip plan.

Referring now to FIG. 27, there is illustrated an example of a transaction for a user searching for a reservable power outlet. A user launches the power outlet app 2302 at step 2702 on their smart phone or other mobile device to enable viewing of several action options available to the user such as "plan trip", "browse outlets", "book controlled outlets", "book lockers", etc. The action options are accessed by selecting a browse outlets link within the app 2302 and a subsequent menu may appear with different outlet categories. The user selects at step 2704 a particular action to be performed through the app 2302 such as browse outlets. Responsive to the specific selection the app 2302 asks for destination and area of coverage at step 2706, the latter being the size of the area to be viewed in miles, yards or even in metric units. System 2304 displays at step 2708 the various locations of power outlets and their characteristics and the number of outlets that are installed at a location, and if the user had asked to browse control power outlets, the system would prompt the user to reserve the outlet and offer available time slots at 2709.

The user may browse destination points that they intend to visit during their trip to ensure there are power outlets available during the trip. Once satisfied with the availability of power outlets at the specified stopping points, the system will ask for the expected duration to be spent at each stop location specified at step 2710. Responsive to the user selection, the system will generate a trip plan that lists the recommended sequence of trip stops and the times allotted at each stop. The user can also insert trip stops that may not have outlets and make those a part of the trip plan and the system will incorporate the trip stops and the expected elapsed time into consideration of the estimated battery drain of the user's device. The power outlet manager system 2304 will specify where power outlets are available along the trip plan and provide recommended times for a charging session. The system will ask the user to confirm the recommendation at step 2716 or to make changes at step 2714. If a user's changes are inconsistent with the characteristics of the user device and planned usage on the trip, the power outlet management system 2304 will prompt the user for alternative selections and/or propose an alternative trip stop. Alternatively, the user can simply plan a trip by selecting plan trip on an opening screen of their device, and the system will check the availability of power outlets at various destination points and generate a trip plan with appropriate trip stop sequences. Upon a user's confirmation of a trip plan at step 2716, the system will prompt the user along the way and initiate alerts as scheduled power outlet reservation times are imminent in order to display the trip plan summary at step 2718. Should the user deviate from the trip plan schedule and appear to endanger a device's battery life, the system 2304 will prompt for corrective action and may propose a change of stop sequence to enable alternative booking of power outlets. However, the changes may result in booking cancellation penalties which are charged directly to a user's credit card or bank account on file with the system.

Figure 28:
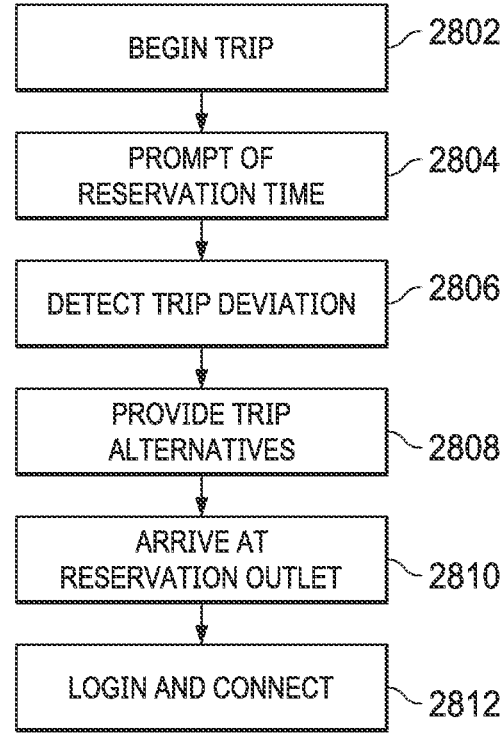
FIG. 28 illustrates a flow diagram of the use of an established trip plan and utilizing reservations associated therewith.

Referring now to FIG. 28, there is illustrated a flow diagram describing the process of utilizing a generated trip plan. The user will begin their trip at step 2802, and the system will prompt the user along the way of approaching reservation times at step 2804 as the scheduled power outlet reservation times become imminent. Should the system detect user deviations from the trip plan schedule at step 2806 and appear to endanger the battery life of a device, the system will prompt for corrective action and may propose a change of stop sequences for the trip at step 2808 to enable an alternative power outlet booking. However, such changes may result in booking cancellation penalties which are charged directly to a user's credit card or bank account. When a user stops at an appointed reservation time at an appointed power outlet at step 2810 they will log into and connect to the power outlet at step 2812. Such login may incorporate security protocols such as token exchange, entering of a passcode transmitted to the user by the system, or other security protocol exchanges.

In addition to the features disclosed previously, the power outlet management system 2304 can also capture and maintain a database of neighborhood parameters such as the availability of handicap parking near the particular power outlets or even the location of handicap accessible washrooms nearby. This is particularly useful for power outlet locations that are co-located in activity venues such as restaurants, libraries, cinemas or places where people go to enjoy certain stationary activities such as dining, book reading watching a movie, etc. The system may interact with or access other databases to obtain data on area facilities such as medical facilities, post office, specialty stores, etc. The system's database search routines can incorporate filters or other database search techniques to customize a user search for outlets, such that the user can narrow down their outlet search with Boolean or parameter matching conditions to locate the ideal outlet for their needs.

The architecture of the system is designed to be an open platform enabling the incorporation of third-party apps and system components such as third-party cloud platforms, group meeting and group gifting apps. In addition, the functionalities of the system is an open system that can provide the same reservation and charging functionality for different power outlets and other rechargeable devices such as E-bikes, two-wheel balance scooters, Segway devices, electric vehicles or even smart phones and tablets, and portable respiratory devices depending on the particular venue or location host. Also, outlet reporters (or registrars) and providers can register the location of such alternative power outlets as may be appropriate for particular devices.

The described system applies to numerous types of power or utility other than electric outlets as there are other analogous outlets that are prevalent in different forms, such as water taps connected to a water source/reservoir and such systems resources are conveyed by means of movement of the water from a storage tank/reservoir to an outlet in the form of water. The above-described applications and techniques would also be applicable to the provision of other types of resources such as hydrogen fuel.

It will be appreciated by those skilled in the art having the benefit of this disclosure that this universal automated system for identifying, registering and verifying the existence, location and characteristics of electric and other power outlets by random users and for retrieval and utilization of such parametric data and outlets by all users provides a manner for tracking and locating power outlets for electric vehicles, personal mobility electric devices, and other electric and electronic devices. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for registering power outlets for electric vehicle charging that may be used to charge electric vehicles, comprising:
    a database for storing subscriber data relating to subscribers registered with the system and power outlet data relating to registered power outlets for electric vehicle charging that have been located by a reporting entity;
    a server for providing a power outlet management system, wherein the server is configured to:
        receive the power outlet data for a power outlet for electric vehicle charging from the reporting entity;
        register the power outlet for electric vehicle charging with the power outlet management system if the power outlet for electric vehicle charging has not previously been registered;
        store the power outlet data for the power outlet for electric vehicle charging in the database;
    wherein the server is further configured to:
        receive a search request for a useable power outlet for electric vehicle charging from a subscriber, the search request including location information defining an area of search for the useable power outlet for electric vehicle charging;
        locate at least one power outlet for electric vehicle charging within the area of search that is registered with the power outlet management system;
        provide a location of the at least one power outlet for electric vehicle charging located within the area of search to the subscriber; and
    a network interface for connecting the server to a network for receiving the power outlet data and the search request.

2. The system of claim 1, wherein the server is further configured to:
    receive a position and characteristics of the power outlet for charging the electric vehicle as part of the power outlet data of the power outlet for charging the electric vehicle; and
    store the position and the characteristics of the power outlet for charging the electric vehicle in the database.

3. The system of claim 1, wherein the server is further configured to:
    determine a user profile associated with the subscriber providing the search request; and
    provide the location of the at least one power outlet for electric vehicle charging located within the area of search of the subscriber and having a power outlet profile matching the determined user profile.

4. The system of claim 1, wherein the server is further configured to:
    receive a request for a reservation of the at least one power outlet for electric vehicle charging; and
    reserve the at least one power outlet for electric vehicle charging for the subscriber responsive to the request for reservation.

5. The system of claim 1, wherein the server is further configured to:
    receive a trip plan request from the subscriber, the trip plan request including a plurality of stopping points therein between a starting point and an ending point;
    generate a trip plan including a location of the at least one power outlet for charging the electric vehicle between the starting point and the ending point; and
    provide the trip plan to the subscriber.

6. The system of claim 5, wherein the server is further configured to:
    receive revisions to the trip plan from the subscriber;
    revise the trip plan based on subscriber revisions; and
    provide a revised trip plan to the subscriber.

7. The system of claim 1 further comprising a plurality of power outlet management applications located on user devices for generating the power outlet data and the search request provided to the server.

8. The system of claim 1, wherein the reporting entity further comprises robot programs ("bots") that probe various energy grids to automatically identify and register points of power distribution and dispensation which may embody the power outlets for electric vehicle charging that are accessible.

9. A method for registering power outlets electric vehicle charging that may be used to charge electric vehicles, comprising:
    connecting a server to a network for receiving power outlet data and a search request;
    storing subscriber data relating to subscribers registered with a power outlet management system and the power outlet data relating to registered power outlets for electric vehicle charging that have been located by a subscriber;
    receiving the power outlet data for a power outlet for electric vehicle charging from the subscriber at the power outlet management system;

registering the power outlet for electric vehicle charging with the power outlet management system if the power outlet for electric vehicle charging has not previously been registered;

storing the power outlet data for the power outlets for electric vehicle charging in a database;

receiving the search request for a useable power outlet for electric vehicle charging from the subscriber, the search request including location information defining an area of search for the useable power outlet for electric vehicle charging at the power outlet management system;

locating at least one power outlet within the area of search that is registered with the power outlet management system; and providing a location of the at least one power outlet for electric vehicle charging located within the area of search to the subscriber from the power outlet management system.

10. The method of claim 9 further comprising:

receiving a position and characteristics of the power outlet for electric vehicle charging as part of the power outlet data of the power outlet for electric vehicle charging; and storing the position and the characteristics of the power outlet for electric vehicle charging in the database.

11. The method of claim 9 further comprising:

determining a user profile associated with the subscriber providing the search request at the power outlet management system; and providing the location of the at least one power outlet for electric vehicle charging located within the area of search of the subscriber and having an outlet profile matching the determined user profile.

12. The method of claim 9 further comprising:

receiving a request for a reservation of the at least one power outlet for electric vehicle charging at the power outlet management system; and reserving the at least one power outlet for electric vehicle charging for the subscriber responsive to the request for reservation at the power outlet management system.

13. The method of claim 9 further comprising the steps of:

receiving a trip plan request from the subscriber at the power outlet management system, the trip plan request including a plurality of stopping points therein between a starting point and an ending point;

generating a trip plan including a location of at least one power outlet for electric vehicle charging between the starting point and the ending point at the power outlet management system; and providing the trip plan to the subscriber.

14. The method of claim 9 further comprising generating the power outlet data and the search request provided to the server at a plurality of power outlet management applications located on user devices.

15. An application for registering power outlets for electric vehicle charging that may be used to charge electric vehicles, comprising:

a sequence of instructions stored on a non-transitory computer usable medium for implementing registration of power outlets for electric vehicle charging, the sequence of instructions which when executed by a processor causes said processor to:

provide a user interface for generating power outlet data relating to a power outlet for electric vehicle charging;

generate power outlet data for the power outlet for charging an electric vehicle responsive to first inputs from the user interface;

initiate a registration for the power outlet for electric vehicle charging with a power outlet management system if the power outlet for electric vehicle charging has not previously been registered;

transmit the power outlet data for the power outlet for electric vehicle charging to the power outlet management system;

wherein the sequence of instructions further cause the processor to:

generate a search request for a useable power outlet for electric vehicle charging responsive to second inputs from the user interface, the search request including location information defining an area of search for the useable power outlet for electric vehicle charging;

transmit the search request to the power outlet management system;

receive a response to the search request indicating at least one useable power outlet for electric vehicle charging; and display the response on the user interface.

16. The application of claim 15, wherein the sequence of instructions further configures the processor to transmit a position and characteristics of the power outlet for electric vehicle charging as part of the power outlet data of the power outlet to the power outlet management system.

17. The application of claim 15, wherein the sequence of instructions further configures the processor to:

transmit a request for a reservation of at least one power outlet for electric vehicle charging; and receive a reservation confirmation for the at least one power outlet for electric vehicle charging for a subscriber responsive to the request for the reservation.

18. The application of claim 15, wherein the sequence of instructions further configures the processor to:

transmit a trip plan request for a reservation of at least one power outlet for electric vehicle charging to the power outlet management system; and receive a trip plan responsive to the trip plan request from the power outlet management system.

19. The application of claim 18, wherein the sequence of instructions further configures the processor to:

receive revisions to the trip plan from a subscriber through the user interface;

provide subscriber revisions to the trip plan through the user interface;

generated revision requests to the trip plan responsive to the subscriber revisions; and transmit the revision requests to the power outlet management system.

* * * * *